United States Patent
Mantravadi et al.

(10) Patent No.: US 8,542,765 B2
(45) Date of Patent: *Sep. 24, 2013

(54) HIERARCHICAL CODING WITH MULTIPLE ANTENNAS IN A WIRELESS COMMUNICATION SYSTEM

(75) Inventors: Ashok Mantravadi, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

This patent is subject to a terminal disclaimer.

(21) Appl. No.: 12/777,518

(22) Filed: May 11, 2010

(65) Prior Publication Data

US 2010/0220708 A1 Sep. 2, 2010

Related U.S. Application Data

(63) Continuation of application No. 10/791,314, filed on Mar. 1, 2004, now Pat. No. 7,724,838.

(60) Provisional application No. 60/506,466, filed on Sep. 25, 2003.

(51) Int. Cl.
*H04J 3/00* (2006.01)

(52) U.S. Cl.
USPC ........... 375/295; 375/260; 375/261; 375/263; 375/267; 375/299; 375/296; 375/347; 375/349; 370/310; 370/464; 370/341; 455/101; 455/103; 455/522

(58) Field of Classification Search
USPC ................. 375/295, 260, 261, 263, 267, 299, 375/296, 347, 349; 370/310, 464, 341; 455/101, 103, 522
See application file for complete search history.

(56) References Cited

U.S. PATENT DOCUMENTS 5,852,630 A * 12/1998 Langberg et al. ............. 375/219
6,377,607 B1   4/2002 Ling et al.
(Continued)

FOREIGN PATENT DOCUMENTS

EP   1207645     5/2002
JP   2002-344965  11/2002
(Continued)

OTHER PUBLICATIONS

Taiwan Search Report—TW093129270—TIPO—Apr. 23, 2011.

(Continued)

*Primary Examiner* — Siu Lee
(74) *Attorney, Agent, or Firm* — Fulbright & Jaworski LLP

(57) ABSTRACT

Techniques are provided for performing hierarchical coding in a multi-antenna communication system (e.g., a SIMO, MISO, or MIMO system). At a transmitter, a base stream and an enhancement stream are coded and modulated separately to obtain first and second data symbol streams, respectively. The first data symbol stream is processed in accordance with a first spatial processing scheme (e.g., a transmit diversity or a spatial multiplexing scheme) to obtain a first set of symbol substreams. The second data symbol stream is processed in accordance with a second spatial processing scheme (e.g., transmit diversity or spatial multiplexing) to obtain a second set of symbol substreams. The first set of symbol substreams is combined (e.g., using time division multiplexing or superposition) with the second set of symbol substreams to obtain multiple transmit symbol streams for transmission from multiple transmit antennas. A receiver performs complementary processing to recover the base stream and enhancement stream.

44 Claims, 18 Drawing Sheets

(56) References Cited

U.S. PATENT DOCUMENTS

| | | |
|---|---|---|
| 6,452,981 B1 | 9/2002 | Raleigh et al. |
| 6,473,467 B1 | 10/2002 | Wallace et al. |
| 6,731,668 B2 | 5/2004 | Ketchum |
| 6,785,341 B2 | 8/2004 | Walton et al. |
| 6,853,677 B2 | 2/2005 | Kim et al. |
| 6,873,606 B2 | 3/2005 | Agrawal et al. |
| 6,985,434 B2 | 1/2006 | Wu et al. |
| 6,987,819 B2 | 1/2006 | Thomas et al. |
| 7,095,709 B2 | 8/2006 | Walton et al. |
| 7,149,254 B2 | 12/2006 | Sampath |
| 7,154,936 B2 | 12/2006 | Bjerke et al. |
| 7,724,838 B2 * | 5/2010 | Mantravadi .......... 375/295 |
| 2002/0088005 A1 | 7/2002 | Wu et al. |
| 2002/0118781 A1 | 8/2002 | Thomas et al. |
| 2002/0154705 A1 | 10/2002 | Walton et al. |
| 2002/0193146 A1 | 12/2002 | Wallace et al. |
| 2003/0003880 A1 | 1/2003 | Ling et al. |
| 2003/0012315 A1 | 1/2003 | Fan |
| 2003/0072382 A1 | 4/2003 | Raleigh et al. |
| 2003/0103571 A1 * | 6/2003 | Meehan et al. ......... 375/240.27 |
| 2003/0108117 A1 | 6/2003 | Ketchum et al. |
| 2003/0125040 A1 | 7/2003 | Walton et al. |
| 2003/0128658 A1 | 7/2003 | Walton et al. |
| 2003/0157954 A1 | 8/2003 | Medvedev et al. |
| 2003/0165189 A1 | 9/2003 | Kadous |
| 2003/0210750 A1 | 11/2003 | Onggosanusi et al. |
| 2004/0082356 A1 | 4/2004 | Walton et al. |
| 2005/0078665 A1 | 4/2005 | Yu et al. |
| 2005/0281241 A1 | 12/2005 | Webster et al. |
| 2006/0018247 A1 | 1/2006 | Driesen et al. |
| 2006/0029146 A1 | 2/2006 | Catreux et al. |
| 2006/0099955 A1 | 5/2006 | Kasapi et al. |
| 2007/0036069 A1 | 2/2007 | Wu et al. |

FOREIGN PATENT DOCUMENTS

| | | |
|---|---|---|
| JP | 2003-023381 | 1/2003 |
| WO | 0139456 | 5/2001 |
| WO | 02082689 | 10/2002 |
| WO | 02089371 | 11/2002 |

OTHER PUBLICATIONS

Chih-Hung Kuo et al: "Embedded space-time coding for wireless broadcast with heterogeneous receivers" GLOBECOM'02. 2002—IEEE Global Telecommunications Conference. Conference Proceedings. Taipei, Taiwan, Nov. 17-21, 2002; [IEEE Global Telecommunications Conference], New York, NY : IEEE, US LNKD-DOI : 10.1109/GLOCOM.2002.1188498, vol. 2, Nov. 17, 2002, pp. 1749-1753, XP010636443.

European Search Report and Written Opinion—EP10162201, Search Authority—Munich Patent Office, Sep. 8, 2010.

Kuo C et al: "Embedded space-time coding for wireless broadcast" Visual Communications and Image Processing; Jan. 21, 2002-Jan. 23, 2002; San Jose, Jan. 21, 2002, XP030080592.

Paulraj A et al: "ST Coding for Intermediate Rates (1<Rs <Mt)" May 1, 2003, Introduction to Space-Time Wireless Communications, Cambridge University Press, GB, pp. 126-129, XP007910305.

Sabir M F et al: "An unequal error protection scheme for multiple input multiple output systems" Conference Record of the 36th. Asilomar Conference on Signals, Systems & Computers. Pacific Groove, CA, Nov. 3-6, 2002; [AS1 Lomar Conference on Signals, Systems and Computers], New York, NY: IEEE, US, vol. 1, Nov. 3, 2002, pp. 575-579, XP010638271.

Signals, Systems & Computers. Pacific Groove, CA, Nov. 3-6, 2002; [AS1 Lomar Conference On Signals, Systems and Computers], New York, NY: IEEE, US, vol. 1, Noc. 3, 2002, pp. 575-579, XP010638271.

Alamouti, "A simple transmit diversity technique for wireless communications," IEEE Journal on Selected Areas in Communications, vol. 16, No. 8, Oct. 1998, pp. 1451-1458.

International Search Report, PCT/US2004/031828, International Searching Authority, European Patent Office, Feb. 24, 2005.

Written Opinion, PCT/US2004/031828, International Searching Authority, European Patent Office, Feb. 24, 2005.

International Preliminary Report on Patentability, PCT/US2004/031828, International Preliminary Examining Authority, United States, Mar. 30, 2006.

Kannan Ramchandran et al., "Multiresolution Broadcast for Digital HDTV Using Joint Source/Channel Coding", Jan. 1, 1993, pp. 6-22.

E.G. Larsson et al., "Space-Time Block Coding for Wireless Communications", May 2003, whole document.

Thomas M. Cover, "Broadcast Channels", Jan. 1972, p. 2.

Heath et al., "Multiuser diversity for MIMO wireless systems with linear receivers", Nov. 4, 2001, p. 1195.

Amroui et al., "Coding for the MIMO Broadcast Channel", Jun. 29, 2003, p. 296.

Ten Brink et al., "Detection Thresholds of Iterative MIMO processing", Jun. 30, 2002, whole document.

Witzke et al., "Iterative Detection of MIMO Signals With Linear Detectors", Nov. 3, 2002, pp. 289-293.

Yisheng et al., "Cooperated TDMA Unlink Based on Hierarchically Modulated Alamouti Code", Feb. 18, 2004, p. 201.

Taiwan Search Report—TW093129270—TIPO—Feb. 13, 2012.

* cited by examiner

HIERARCHICAL CODING WITH MULTIPLE ANTENNAS IN A WIRELESS COMMUNICATION SYSTEM

CROSS-REFERENCE TO RELATED APPLICATION

This application is a continuation of U.S. patent application Ser. No. 10/791,314, filed Mar. 1, 2004 which claims priority to U.S. Provisional Patent Application Ser. No. 60/506,466, filed Sep. 25, 2003, and which is incorporated herein by reference in their entirety.

I. FIELD

The present invention relates generally to communication, and more specifically to techniques for performing hierarchical coding in a wireless communication system.

II. BACKGROUND

Wireless communication systems are widely deployed to provide various communication services such as voice, packet data, broadcast, and so on. These systems may be capable of providing communication for multiple users simultaneously by sharing the available system resources. Some examples of such systems include code division multiple access (CDMA) systems, time division multiple access (TDMA) systems, and frequency division multiple access (FDMA) systems.

A wireless communication system may provide broadcast service, which typically entails the transmission of broadcast data to users in a designated broadcast area instead of specific users. Since a broadcast transmission is intended to be received by multiple users within the broadcast area, the broadcast data rate is normally determined by the user with the worst channel conditions. Typically, the worst-case user is located far away from a transmitting base station and has a low signal-to-noise ratio (SNR).

The users in the broadcast area typically experience different channel conditions, achieve different SNRs, and are capable of receiving data at different data rates. Hierarchical transmission may then be used to improve broadcast service. With hierarchical transmission, the broadcast data is divided into a "base stream" and an "enhancement stream". The base stream is transmitted in a manner such that all users in the broadcast area can recover this stream. The enhancement stream is transmitted in a manner such that users experiencing better channel conditions can recover this stream. Hierarchical transmission is also referred to as hierarchical coding, where the term "coding" in this context refers to channel coding rather than data coding at the transmitter.

One conventional method of implementing hierarchical coding is through the use of non-uniform modulation. In this method, data for the base stream is modulated with a first modulation scheme and data for the enhancement stream is modulated with a second modulation scheme that is superimposed on the first modulation scheme. The first modulation scheme is typically a low-order modulation scheme such as QPSK, and the second modulation scheme may also be QPSK. In this case, the resultant modulated data for both streams may resemble 16-QAM modulated data. All users in the broadcast area are able to recover the base stream using QPSK demodulation. Users with better channel conditions are also able to recover the enhancement stream by removing the modulation due to the base stream. Hierarchical coding using non-uniform modulation is implemented by some conventional systems such as a Direct Video Broadcasting standard T (DVB-T) system.

Hierarchical coding is conventionally used for a single-input single-output (SISO) system. A SISO system employs a single antenna at a transmitter and a single antenna at a receiver. For the SISO system, hierarchical coding may be implemented, for example, using non-uniform modulation as described above.

A wireless communication system may employ multiple antennas at either the transmitter or the receiver, or at both the transmitter and receiver. The multiple antennas may be used to provide diversity against deleterious path effects and/or to improve transmission capacity, both of which are desirable. There is a need in the art for techniques to perform hierarchical coding with multiple antennas in a wireless communication system.

SUMMARY

Techniques are provided herein for performing hierarchical coding in a multi-antenna communication system. This system may be a multiple-output single-input (MISO) system with multiple antennas at a transmitter, a single-input multiple-output (SIMO) system with multiple antennas at a receiver, or a multiple-input multiple-output (MIMO) system with multiple antennas at both the transmitter and receiver. These techniques may be used to transmit multiple data streams (e.g., a base stream and an enhancement stream) to different receiving entities capable of achieving different SNRs.

At a transmitter in a MISO or MIMO system, the base stream and enhancement stream are coded and modulated individually to obtain first and second data symbol streams, respectively. The first data symbol stream is processed in accordance with a first spatial processing scheme (e.g., a transmit diversity scheme or a spatial multiplexing scheme) to obtain a first set of symbol substreams. The second data symbol stream is processed in accordance with a second spatial processing scheme (e.g., a transmit diversity scheme or a spatial multiplexing scheme) to obtain a second set of symbol substreams. Various transmit diversity and spatial multiplexing schemes are described below. The first set of symbol substreams is combined with the second set of symbol substreams to obtain multiple transmit symbol streams for transmission from multiple transmit antennas. The combining may be achieved by time division multiplexing (TDM) the first set of symbol substreams with the second set of symbol substreams to obtain the multiple transmit symbol streams. Alternatively, the combining may be achieved with superposition by (1) scaling the first set of symbol substreams with a first scaling factor, (2) scaling the second set of symbol substreams with a second scaling factor, and (3) summing the first set of scaled symbol substreams with the second set of scaled symbol substreams to obtain the multiple transmit symbol streams. The first and second scaling factors determine the amount of transmit power to use for the base stream and enhancement stream, respectively.

Different receiver architectures may be used to recover the base stream and enhancement stream, depending on whether these streams are transmitted using TDM or superposition. If TDM was used, a receiver in a SIMO or MIMO system initially time division demultiplexes multiple received symbol streams, which are obtained via multiple receive antennas, to provide a first set of received symbol substreams for the base stream and a second set of received symbol substreams for the enhancement stream. The first set of received symbol substreams is processed in accordance with the first spatial processing scheme to obtain a first recovered data symbol stream, which is further demodulated and decoded to obtain a decoded base stream. The second set of received symbol substreams is processed in accordance with the second spatial processing scheme to obtain a second recovered data symbol stream, which is further demodulated and decoded to obtain a decoded enhancement stream.

If superposition was used, a receiver in a SIMO or MIMO system initially processes the multiple received symbol streams in accordance with the first spatial processing scheme to obtain the first recovered data symbol stream, which is demodulated and decoded to obtain the decoded base stream. Interference due to the decoded base stream is estimated and canceled from the received symbol streams to obtain modified symbol streams. The modified symbol streams are then processed in accordance with the second spatial processing scheme to obtain the second recovered data symbol stream, which is demodulated and decoded to obtain the decoded enhancement stream. The enhancement stream may also be recovered in multiple stages, with each stage recovering a decoded enhancement substream for one of the transmit antennas.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein for performing hierarchical coding may be used for various types of wireless communication systems, including single-carrier and multi-carrier communication systems. Examples of multi-carrier systems include an orthogonal frequency division multiple access (OFDMA) communication system, an orthogonal frequency division multiplexing (OFDM) system, and so on. For clarity, these techniques are specifically described below for a single-carrier system.

1. Hierarchical Coding in a SISO System

Figure 1:
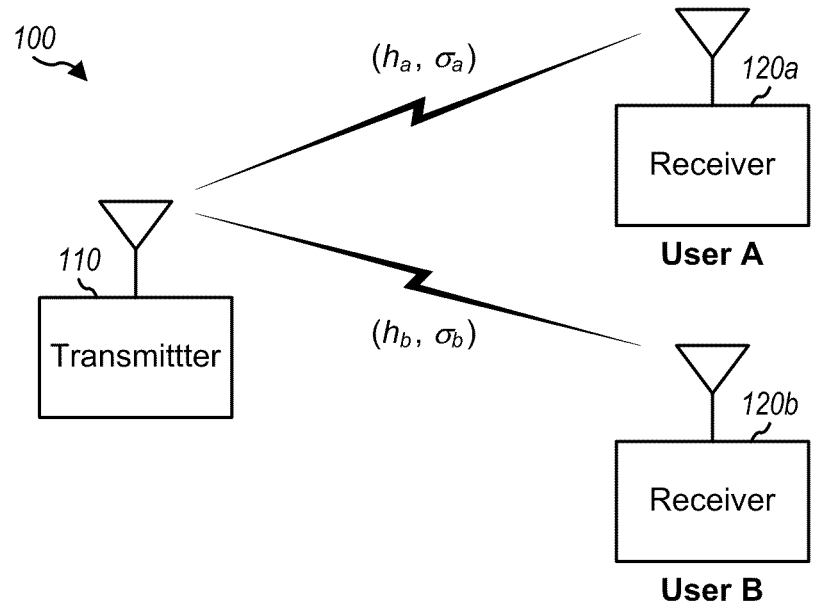
FIG. 1 shows a SISO system.

FIG. 1 shows a SISO system 100 with a transmitter 110 and two receivers 120a and 120b for two users A and B. In general, a SISO system may include any number of transmitters and any number of receivers for any number of users. For simplicity, only one transmitter and two receivers for two users are shown in FIG. 1 and considered below. For SISO system 100, transmitter 110 is equipped with a single antenna and each of receivers 120a and 120b is also equipped with a single antenna. The communication channel between transmitter 110 and receiver 120a has a complex channel gain of $h_a$ and a noise variance of $\sigma_a$. The communication channel between transmitter 110 and receiver 120b has a complex channel gain of $h_b$ and a noise variance of $\sigma_b$, with $\sigma_b > \sigma_a$. User A thus achieves a higher SNR than user B.

A two-tiered broadcast service may be implemented whereby broadcast data is divided into a base stream and an enhancement stream. The base stream is sent at a rate that can be received by both users A and B. The enhancement stream is sent at a rate that can be received by user A with the better SNR. Users A and B are representative of two different groups of users capable of achieving two different ranges of SNRs. The two streams may be sent using a time division multiplexing (TDM) scheme or a superposition scheme.

For the time division multiplexing scheme, the base stream is sent a fraction of the time and the enhancement stream is sent the remainder of the time. A signal model for users A and B for the TDM scheme in SISO system 100 may be expressed as:

$$y_a = s + n_a, \text{ and} \quad \text{Eq (1)}$$

$$y_b = s + n_b,$$

where s is a data symbol sent by the transmitter, which may be for the base stream or the enhancement stream;
$y_a$ and $y_b$ are symbols received by users A and B, respectively; and
$n_a$ and $n_b$ are independent Gaussian random variables with variances $\sigma_a^2$ and $\sigma_b^2$, respectively, for the noise observed by users A and B, respectively.

Equation set (1) assumes an additive white Gaussian noise (AWGN) channel for each of users A and B. The main characteristic of an AWGN channel is that it has a constant channel gain, which is assumed to be equal to one (i.e., $h_a = h_b = 1$) in equation set (1).

The maximum rates for users A and B may be expressed as:

$$C_a = \log_2\left(1 + \frac{P}{\sigma_a^2}\right), \quad \text{Eq (2)}$$

and $$C_b = \log_2\left(1 + \frac{P}{\sigma_b^2}\right),$$

where P is the transmit power used for the data symbols; and
$C_a$ and $C_b$ are the maximum rates for users A and B, respectively.

Equation set (2) is based on the Shannon capacity function, which gives the theoretical maximum data rate that may be reliably transmitted over a communication channel with a given channel response and a given noise variance. The Shannon capacity assumes an AWGN channel model and an unconstrained alphabet whereby the data symbols are not restricted to specific points on a signal constellation. The Shannon capacity is also referred to as the unconstrained capacity. Capacity is also referred to as spectral efficiency, and both are given in units of bits per second per Hertz (bps/Hz).

From equation set (2), the communication channel can support a rate of $C_b$ for user B, which can also be received by user A. The communication channel can also support a rate of $C_a$ for user A, which is greater than the rate of $C_b$ for user B since $\sigma_b > \sigma_a$. Rate is typically given in units of bits per second (bps). For simplicity, rate is given in normalized units of bps/Hz in the following description.

For the TDM scheme, the base stream is sent a fraction of the time and needs to be received by both users A and B, with user B having the worse SNR since $\sigma_b > \sigma_a$. The enhancement stream is sent the remainder of the time and only needs to be received by user A, i.e., with no consideration for user B. The overall rates that may be achieved for users A and B for the TDM scheme may be expressed as:

$$R_b = \alpha \cdot C_b, \text{ and} \quad \text{Eq (3)}$$

$$R_a = \alpha \cdot C_b + (1-\alpha) \cdot C_a = R_b + R_e,$$

where $\alpha$ is the fraction of time that the base stream is transmitted, with $1 \geq \alpha \geq 0$;

$(1-\alpha)$ is the fraction of time that the enhancement stream is transmitted;
$R_b$ and $R_e$ are the rates for the base stream and enhancement stream, respectively; and
$R_a$ and $R_b$ are the overall rates for users A and B, respectively. Equation set (3) indicates that the rate $R_b$ for user B is equal to the rate for the base stream. The rate $R_a$ for user A is equal to the rate $R_b$ for the base stream plus the rate $R_e$ for the enhancement stream.

For the superposition scheme, the base stream and enhancement stream are combined and sent at the same time. The transmit power P is divided between the two streams. A signal model for users A and B for the superposition scheme in SISO system 100 may be expressed as:

$$y_a = \sqrt{\alpha \cdot P} \cdot s_b + \sqrt{(1-\alpha) \cdot P} \cdot s_e + n_a, \text{ and} \quad \text{Eq (4)}$$

$$y_b = \sqrt{\alpha \cdot P} \cdot s_b + \sqrt{(1-\alpha) \cdot P} \cdot s_e + n_b,$$

where $s_b$ and $s_e$ are data symbols for the base stream and enhancement stream, respectively;
$\alpha$ is the fraction of the transmit power used for the base stream; and
$(1-\alpha)$ is the fraction of the transmit power used for the enhancement stream.

At a receiver, the base stream is recovered first from a received signal by treating the enhancement stream as additive noise. Once the base stream has been recovered, the interference due to the base stream is estimated and removed from the received signal. The enhancement stream is then recovered with the base stream removed. The overall rates that may be achieved for users A and B for the superposition scheme may be expressed as:

$$R_b = \log_2\left(1 + \frac{\alpha \cdot P}{(1-\alpha) \cdot P + \sigma_b^2}\right), \quad \text{Eq (5a)}$$

and $$R_a = R_b + \log_2\left(1 + \frac{(1-\alpha) \cdot P}{\sigma_a^2}\right) = R_b + R_e. \quad \text{Eq (5b)}$$

Equation set (5) is also based on the Shannon capacity function and under the assumption of an AWGN channel model and an unconstrained alphabet.

In equation (5a), the rate $R_b$ for the base stream is determined based on a transmit power of $\alpha \cdot P$ for the base stream and a total noise of $(1-\alpha) \cdot P + \sigma_b^2$, where the term $(1-\alpha) \cdot P$ is for the interference due to the enhancement stream. In equation (5b), the rate $R_e$ for the enhancement stream is determined based on a transmit power of $(1-\alpha) \cdot P$ for the enhancement stream and a total noise of $\sigma_a^2$, where the interference due to the base stream is assumed to be completely canceled. The rate $R_b$ for user B is equal to the rate for the base stream, and the rate $R_a$ for user A is equal to the rate $R_b$ for the base stream plus the rate $R_e$ for the enhancement stream.

Figure 12:
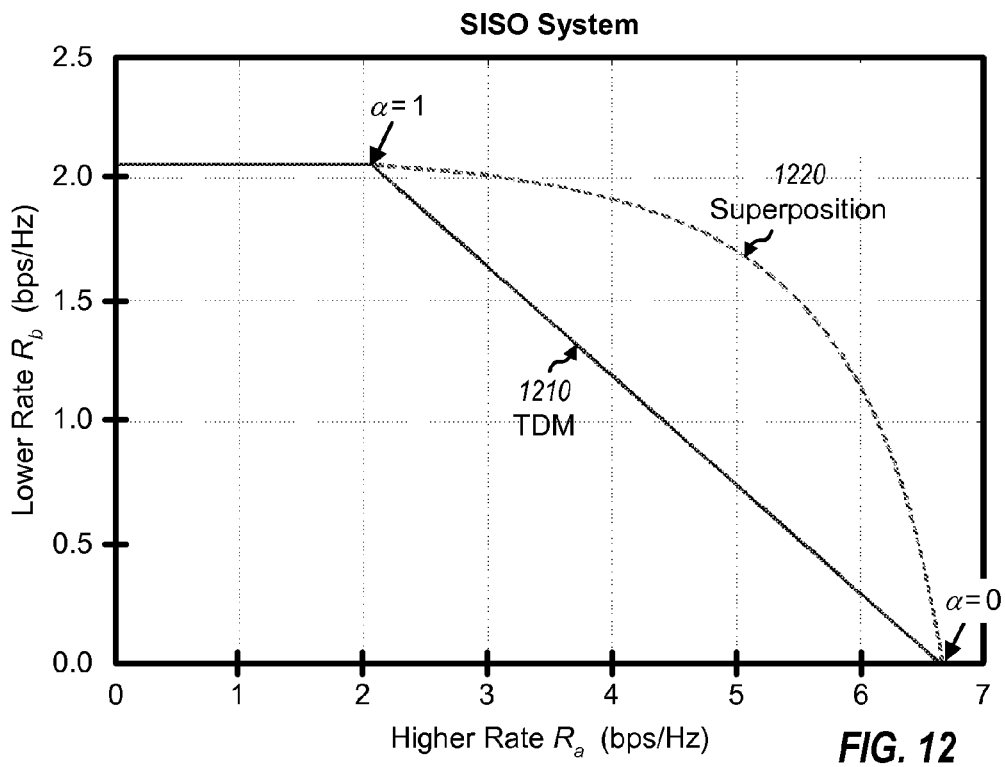
FIG. 12 shows a graph of rate regions for hierarchical coding in the SISO system.

FIG. 12 shows a graph of rate regions for the TDM and superposition schemes for a SISO system with an AWGN channel. The vertical axis represents the rate $R_b$ for user B, which is the rate for the base stream. The horizontal axis represents the rate $R_a$ for user A, which is the combined rate for the base stream and enhancement stream. The rates $R_a$ and $R_b$ are both given in units of bps/Hz in FIG. 12. The performance given in FIG. 12 is for a Raleigh fading channel. Although the hierarchical coding techniques described herein may be used for different channel types, performance may be dependent on the statistics of the channel type.

A plot 1210 shows the achievable rates $R_a$ and $R_b$ for the TDM scheme for different values of $\alpha$. These rates are computed using equation sets (2) and (3) with $P/\sigma_a^2=20$ dB and $P/\sigma_b^2=5$ dB. For $\alpha=1$, only the base stream is transmitted, and $R_a=R_b=2.06$ bps/Hz and $R_e=0$. For $\alpha=0$, only the enhancement stream is transmitted, and $R_a=R_e=6.66$ bps/Hz and $R_b=0$. The rates $R_a$ and $R_b$ for other values of $\alpha$ for the TDM scheme are given by plot 1210.

A plot 1220 shows the achievable rates $R_a$ and $R_b$ for the superposition scheme for different values of $\alpha$. These rates are computed using equation sets (5) with $P/\sigma_a^2=20$ dB and $P/\sigma_b^2=5$ dB.

The rate region for the TDM scheme is the area under plot 1210. The rate region for the superposition scheme is the area under plot 1220. A larger rate region is more desirable. FIG. 12 shows that the superposition scheme has a larger rate region, and thus better performance, than the TDM scheme.

The above description for the TDM and superposition schemes assumes an AWGN channel. For a flat fading channel, the complex channel gain from the transmitter to each user may be represented by a channel variable h, as shown in FIG. 1. This channel variable is assumed to be a complex Gaussian random variable with zero mean, a variance of one, and identically distributed for the two users.

The overall rates that may be achieved for users A and B with a flat fading channel for the superposition scheme in SISO system 100 may be expressed as:

$$R_b = E\left\{\log_2\left(1 + \frac{\alpha \cdot P \cdot |h|^2}{(1-\alpha) \cdot P \cdot |h|^2 + \sigma_b^2}\right)\right\}, \quad \text{Eq (6)}$$

and $$R_a = R_b + E\left\{\log_2\left(1 + \frac{(1-\alpha) \cdot P \cdot |h|^2}{\sigma_a^2}\right)\right\} = R_b + R_e,$$

where $E\{v\}$ denotes the expected value of v. Equation set (6) is based on an ergodic capacity function, which gives the expected maximum data rate given the channel variable h. The rates that may be achieved for users A and B for the TDM scheme with a flat fading channel may also be obtained in similar manner.

2. Hierarchical Coding in a SIMO System

Figure 2A:
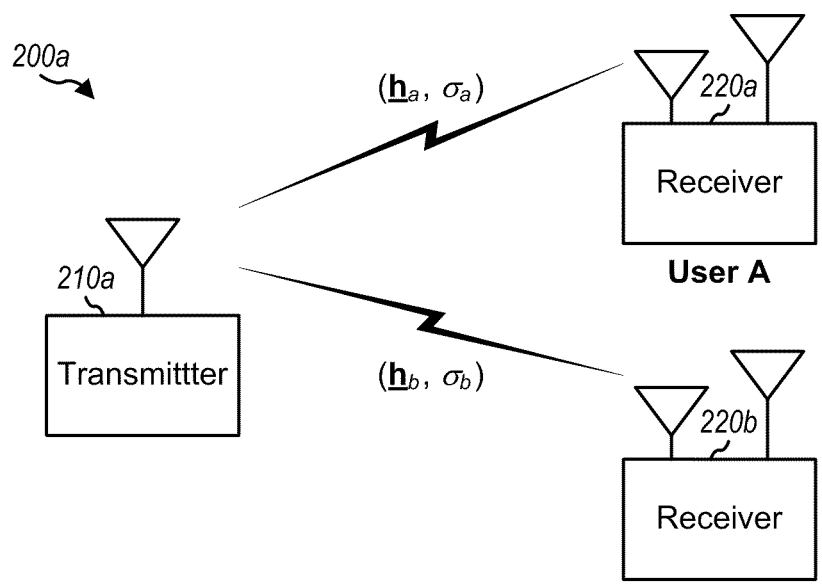
FIGS. 2A through 2C show a SIMO system, a MISO system, and a MIMO system, respectively.

FIG. 2A shows a SIMO system 200a with a transmitter 210a and two receivers 220a and 220b for two users A and B. For a $(1, N_R)$ SIMO system, a transmitter is equipped with a single antenna and a receiver is equipped with $N_R$ antennas, where $N_R>1$. For simplicity, FIG. 2A shows a (1, 2) SIMO system whereby each of receivers 220a and 220b is equipped with two antennas. The communication channel between transmitter 210a and receiver 220a has a channel response vector of $h_a$ and a noise variance of $\sigma_a$. The communication channel between transmitter 210a and receiver 220b has a channel response vector of $h_b$ and a noise variance of $\sigma_b$, with $\sigma_b>\sigma_a$. The channel response vector h for each user includes $N_R$ elements for the complex channel gains between the single transmit antenna and each of the user's $N_R$ receive antennas, i.e., $h=[h_1 \; h_2 \; \ldots \; h_{N_R}]^T$, where "$T$" denotes the transpose.

For a SIMO system, the multiple antennas at the receiver may be used to achieve greater diversity. A signal model for users A and B in SIMO system 200a may be expressed as:

$$y_a = h_a s + n_a, \text{ and} \quad \text{Eq (7)}$$

$$y_b = h_b s + n_b,$$

where $h_a$ and $h_b$ are channel response vectors for users A and B, respectively;

$n_a$ and $n_b$ are noise vectors for users A and B, respectively; and $y_a$ and $y_b$ are vectors with $N_R$ received symbols for $N_R$ received antennas for users A and B, respectively.

A receiver for user i can recover a transmitted data symbol s, as follows:

$$\hat{s} = G_{simo}^{-1} h_i^H y_i = G_{simo}^{-1} h_i^H (h_i s + n_i) = s + \tilde{n}_i, \quad \text{Eq (8)}$$

where $G_{simo}$ is the overall channel gain for user i;

$\hat{s}$ is an estimate of the data symbol s sent by the transmitter; and $\tilde{n}_i$ is the post-processed noise for user i.

The overall channel gain is $G_{simo}=|h_1|^2+|h_2|^2+\ldots+|h_{N_R}|^2$ for $N_R$ receive antennas. For a (1, 2) SIMO system with $N_R=2$, $G_{simo}$ is a chi-squared variable with two degrees of freedom, which assumes a Rayleigh fading channel, and second order diversity is achieved. The hierarchical coding techniques described herein are not dependent on any particular statistical model for the channel and may be applied to other channel types. Equation (8) shows the receiver processing for M-ary phase shift keying (M-PSK) signal constellations. Similar receiver processing may be performed for M-ary quadrature amplitude modulation (M-QAM) signal constellations. The processing at the transmitter and receiver for the base stream and enhancement stream is described in further detail below.

The rates that may be achieved for users A and B for the TDM scheme in a SIMO system with a flat fading channel may be expressed as:

$$R_b = E\left\{\alpha \cdot \log_2\left(1 + \frac{P \cdot G_{simo}}{\sigma_b^2}\right)\right\}, \quad \text{Eq (9)}$$

and $$R_a = R_b + E\left\{(1-\alpha) \cdot \log_2\left(1 + \frac{P \cdot G_{simo}}{\sigma_a^2}\right)\right\} = R_b + R_e.$$

The rates that may be achieved for users A and B for the superposition scheme in a SIMO system with a flat fading channel may be expressed as:

$$R_b = E\left\{\log_2\left(1 + \frac{\alpha \cdot P \cdot G_{simo}}{(1-\alpha) \cdot P \cdot G_{simo} + \sigma_b^2}\right)\right\}, \quad \text{Eq (10)}$$

and $$R_a = R_b + E\left\{\log_2\left(1 + \frac{(1-\alpha) \cdot P \cdot G_{simo}}{\sigma_a^2}\right)\right\} = R_b + R_e.$$

3. Hierarchical Coding in a MISO System

Figure 2B:
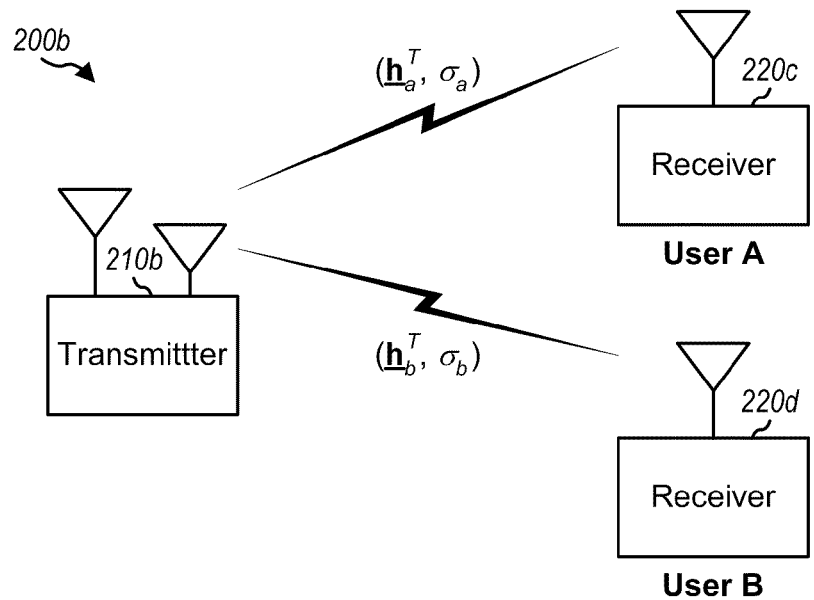

FIG. 2B shows a MISO system 200b with a transmitter 210b and two receivers 220c and 220d for two users A and B. For an $(N_T, 1)$ MISO system, a transmitter is equipped with $N_T$ antennas and a receiver is equipped with a single antenna, where $N_T>1$. For simplicity, FIG. 2B shows a (2,1) MISO system whereby transmitter 210b is equipped with two antennas and each of receivers 220c and 220d is equipped with a single antenna. The communication channel between transmitter 210b and receiver 220c has a channel response vector of $h_a^T$ and a noise variance of $\sigma_a$. The communication channel between transmitter 210b and receiver 220d has a channel response vector of $h_b^T$ and a noise variance of $\sigma_b$, with $\sigma_b>\sigma_a$.

For a MISO system, the multiple antennas at the transmitter may be used to achieve greater diversity. In particular, the base stream and enhancement stream may be sent on the multiple transmit antennas using a transmit diversity scheme, as described below. A signal model for users A and B in MISO system 200*b* may be expressed as:

$$y_a = h_a^T x + n_a, \text{ and} \quad \text{Eq (11)}$$

$$y_b = h_b^T x + n_b,$$

where x is a vector of $N_T$ transmit symbols sent from $N_T$ antennas at the transmitter; $h_a^T$ and $h_b^T$ are channel response vectors for users A and B, respectively; $n_a$ and $n_b$ are noise observed by users A and B, respectively; and $y_a$ and $y_T$ are received symbols for users A and B, respectively. The vector x of transmit symbols is obtained by performing spatial processing on the data symbols. The spatial processing at the transmitter and receiver for the MISO system is described in further detail below.

4. Hierarchical Coding in a MIMO System

Figure 2C:
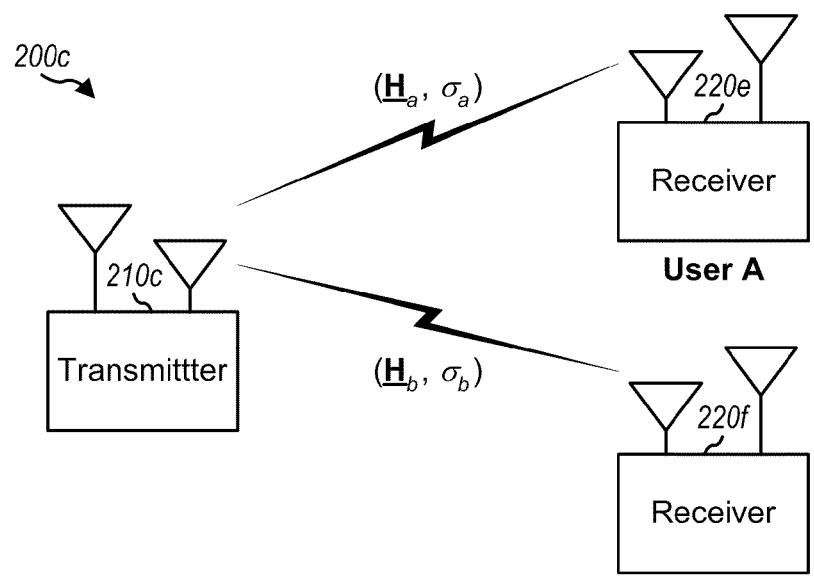

FIG. 2C shows a MIMO system 200*c* with a transmitter 210*c* and two receivers 220*e* and 220*f* for two users A and B. For an ($N_T$, $N_R$) MIMO system, a transmitter is equipped with $N_T$ antennas and a receiver is equipped with $N_R$ antennas, where $N_T>1$ and $N_R>1$. For simplicity, FIG. 2C shows a (2, 2) MIMO system whereby transmitter 210*c* is equipped with two antennas and each of receivers 220*e* and 220*f* is also equipped with two antennas.

Figure 3:
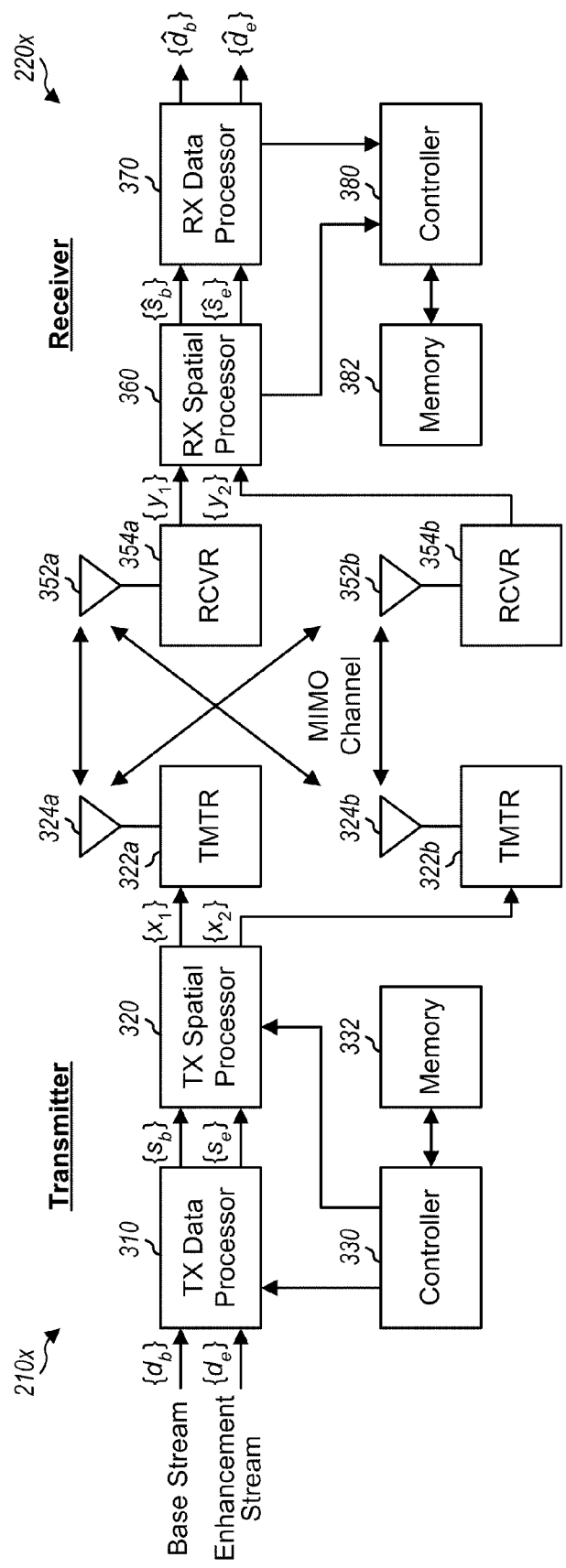
FIG. 3 shows a transmitter and a receiver in the MIMO system.

FIG. 3 shows a block diagram of a transmitter 210*x* and a receiver 220*x*. Transmitter 210*x* is an embodiment of transmitter 210*b* in FIG. 2B and transmitter 210*c* in FIG. 2C. Receiver 220*x* is an embodiment of receivers 220*a* and 220*b* in FIG. 2A and receivers 220*e* and 220*f* in FIG. 2C.

At transmitter 210*x*, a TX data processor 310 receives, codes, interleaves, and modulates data for the base stream $\{d_b\}$ and provides a stream of modulation symbols $\{s_b\}$. TX data processor 310 also receives, codes, interleaves, and modulates data for the enhancement stream $\{d_e\}$ and provides a stream of modulation symbols $\{s_e\}$. The modulation symbols are also referred to herein as data symbols. A TX spatial processor 320 performs spatial processing on the two data symbol streams $\{s_b\}$ and $\{s_e\}$, multiplexes in pilot symbols, and provides two steams of transmit symbols $\{x_1\}$ and $\{x_2\}$. Transmitter units (TMTR) 322*a* and 322*b* receive and process the two transmit symbol streams $\{x_1\}$ and $\{x_2\}$, respectively, to obtain two modulated signals, which are then transmitted from antennas 324*a* and 324*b*.

At receiver 220*x*, the two modulated signals transmitted by transmitter 210*x* are received by antennas 352*a* and 352*b*. Receiver units (RCVR) 354*a* and 354*b* condition, digitize, and process the received signals from antennas 352*a* and 352*b*, respectively, and provide two streams of received symbols $\{y_1\}$ and $\{y_2\}$. An RX spatial processor 360 then processes the two received symbol streams $\{y_1\}$ and $\{y_2\}$ to obtain two recovered data symbol streams $\{\hat{s}_b\}$ and $\{\hat{s}_e\}$, which are estimates of the two data symbol streams $\{s_b\}$ and $\{s_e\}$ sent by transmitter 210*x*. An RX data processor 370 demodulates, deinterleaves, and decodes the recovered data symbol stream $\{\hat{s}_b\}$ to obtain a decoded base stream $\{\hat{d}_b\}$. RX data processor 370 also demodulates, deinterleaves, and decodes the recovered data symbol stream $\{\hat{s}_e\}$ to obtain a decoded enhancement stream $\{\hat{d}_e\}$. The processing units at transmitter 210*x* and receiver 220*x* are described in further detail below.

Controllers 330 and 380 direct the operation at transmitter 210*x* and receiver 220*x*, respectively. Memories 332 and 382 provide storage for program codes and data used by controllers 330 and 380, respectively.

Figure 4A:
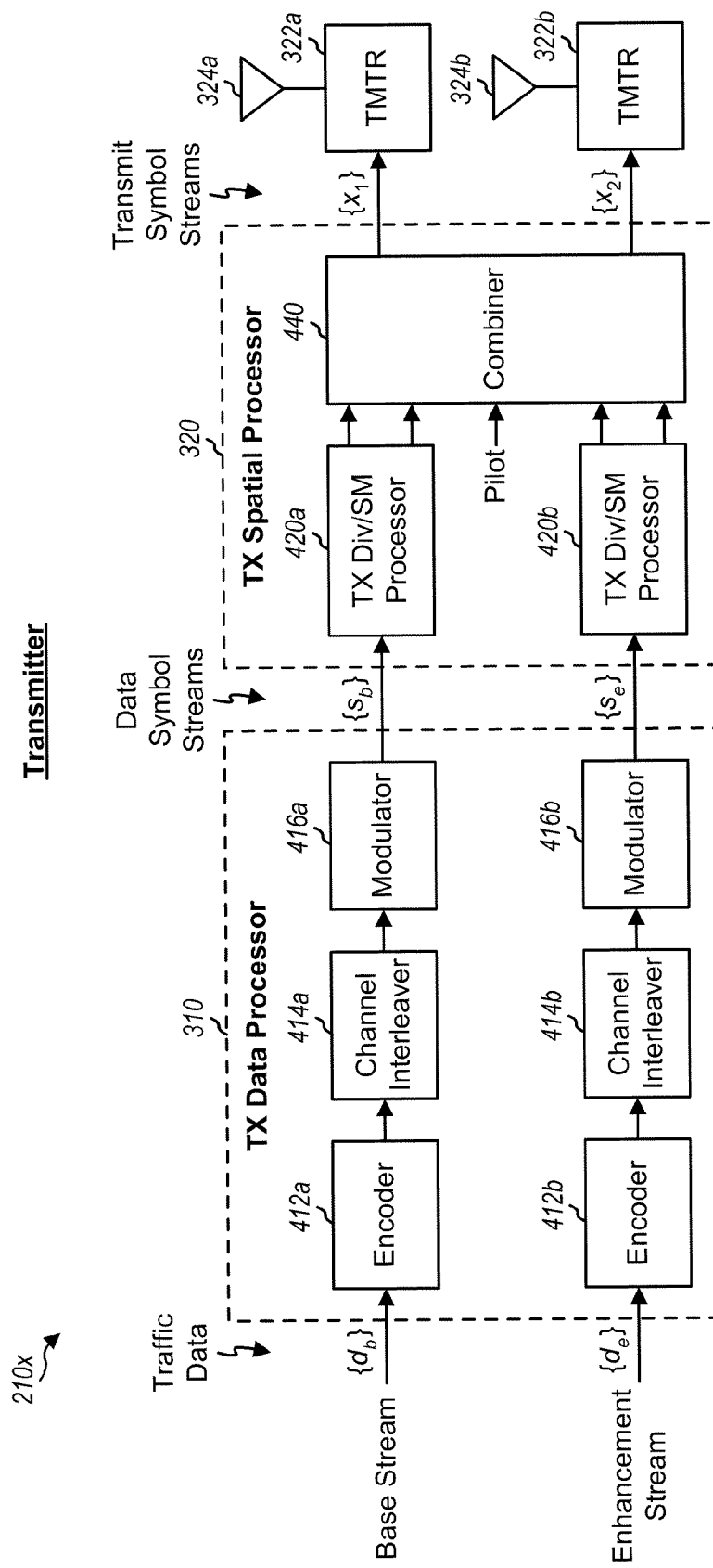
FIG. 4A shows a transmit (TX) data processor and a TX spatial processor within the transmitter.

FIG. 4A shows a block diagram of an embodiment of TX data processor 310 and TX spatial processor 320 within transmitter 210*x*. Within TX data processor 310, an encoder 412*a* receives and codes the base stream data $\{d_b\}$ in accordance with a selected coding scheme to provide code bits. An exemplary design for encoder 412*a* is described below. The encoding increases the reliability of the data transmission. The selected coding scheme may include a convolutional code, a turbo code, a CRC code, a block code, or a combination thereof. A channel interleaver 414*a* interleaves (i.e., reorders) the code bits from encoder 412*a* based on a particular interleaving scheme. The interleaving provides time, frequency, and/or spatial diversity for the code bits. A modulator 416*a* then modulates (i.e., symbol maps) the interleaved data from interleaver 414*a* in accordance with one or more modulation schemes to provide modulation symbols. The modulation may be achieved by (1) grouping sets of B interleaved bits to form B-bit binary values, where $B \geq 1$, and (2) mapping each B-bit binary value to a complex value for a point in a signal constellation for the selected modulation scheme. Modulator 416*a* provides a stream of modulation symbols (i.e., data symbols), where each data symbol is a complex value. The encoding, channel interleaving, and modulation may be performed on each data packet for the base stream.

The enhancement stream data $\{d_e\}$ is coded by an encoder 412*b*, interleaved by a channel interleaver 414*b*, and mapped to modulation symbols by a modulator 416*b*. The coding, interleaving, and modulation schemes for the enhancement stream may be the same or different from those for the base stream. To facilitate certain transmission schemes described below, the enhancement stream may be demultiplexed into two data substreams for the two transmit antennas. Each data substream may be coded, interleaved, and modulated separately so that the two data substreams may be individually recovered by the receiver. This is not shown in FIG. 4A for simplicity.

Figure 4B:
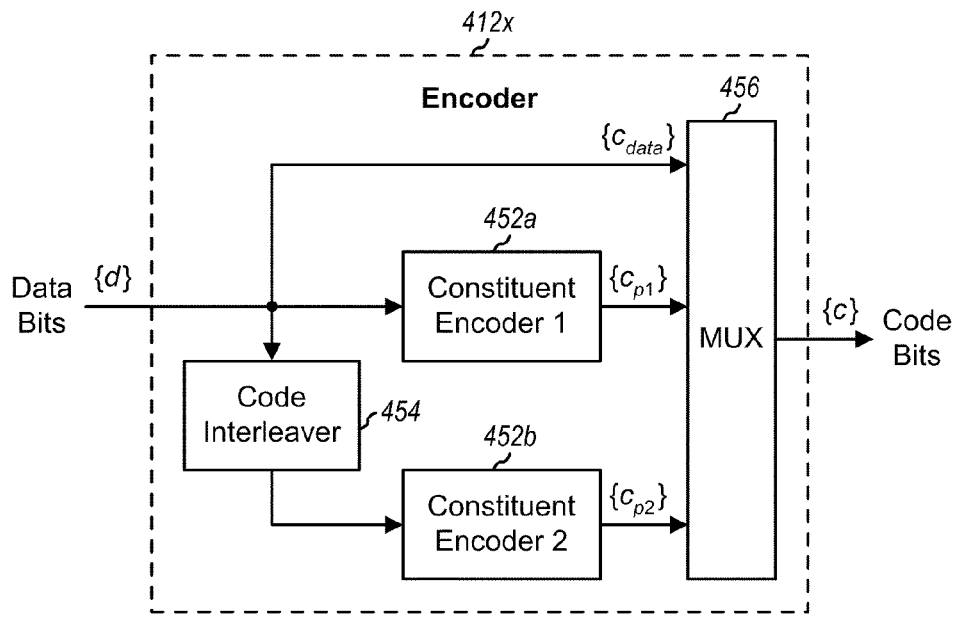
FIG. 4B shows a block diagram of a parallel concatenated convolutional encoder.

FIG. 4B shows a block diagram of a parallel concatenated convolutional encoder 412*x*, which may be used for each of encoders 412*a* and 412*b* in FIG. 4A. Encoder 412*x* includes two constituent convolutional encoder 452*a* and 452*b*, a code interleaver 454, and a multiplexer (MUX) 456. Code interleaver 454 interleaves the data bits $\{d\}$ for the base stream or enhancement stream in accordance with a particular code interleaving scheme.

Constituent encoder 452*a* receives and encodes the data bits $\{d\}$ with a first constituent code and provides first parity bits $\{c_{p1}\}$. Similarly, constituent encoder 452*b* receives and encodes the interleaved data bits from code interleaver 454 with a second constituent code and provides second parity bits $\{c_{p2}\}$. Constituent encoders 452*a* and 452*b* may implement two recursive systematic constituent codes with code rates of $R_1$ and $R_2$, respectively, where $R_1$ may or may not be equal to $R_2$. Multiplexer 456 receives and multiplexes the data bits $\{d\}$, which are also denoted as $\{c_{data}\}$, the first parity bits $\{c_{p1}\}$ from encoder 452*a*, and the second parity bits $\{c_{p2}\}$ from encoder 452*b* and provides the code bits $\{c\}$ for the base stream or enhancement stream. The coding is typically performed on one data packet at a time.

FIG. 4B shows an exemplary design for the encoder. Other types of encoder may also be used and this is within the scope of the invention. Moreover, the same or different types of encoders may be used for the base stream and enhancement stream.

Other exemplary designs for encoders 412, channel interleavers 414, and modulators 416 are described in commonly assigned provisional U.S. Patent Application Ser. No. 60/421,309, entitled "MIMO WLAN System," filed on Oct. 25, 2002.

Within TX spatial processor 320, a TX transmit diversity/spatial multiplexing (Div/SM) processor 420a performs spatial processing on the data symbols {$s_b$} for the base stream and provides two symbol substreams for the two transmit antennas. A TX Div/SM processor 420b performs spatial processing on the data symbols {$s_e$} for the enhancement stream and provides two symbol substreams for the two transmit antennas. For a MISO system, TX Div/SM processors 420a and 420b perform spatial processing for a transmit diversity scheme, as described below. For a MIMO system, TX Div/SM processors 420a and 420b can perform spatial processing for a transmit diversity scheme, a spatial multiplexing scheme, or some other transmission scheme. The spatial processing by TX Div/SM processors 420a and 420b is described in detail below. A combiner 440 receives and combines the two symbol substreams for the base stream with the two symbol substreams for the enhancement stream to obtain the two transmit symbol streams {$x_1$} and {$x_2$}. Combiner 440 may implement a TDM scheme, a superposition scheme, or some other scheme, and is also described in detail below. The transmit symbol streams {$x_1$} and {$x_2$} are provided to transmitter units 322a and 322b, respectively.

Referring back to FIG. 2C, a signal model for users A and B in MIMO system 200c may be expressed as:

$$y_a = H_a x + n_a, \text{ and} \qquad \text{Eq (12)}$$

$$y_b = H_b x + n_b,$$

where $H_a$ and $H_b$ are $N_R \times N_T$ channel response matrices for users A and B, respectively, and all other terms are as defined above.

The channel response matrix H for each user includes $N_R \times N_T$ elements for the complex channel gains between each of the $N_T$ transmit antennas and each of the user's $N_R$ receive antennas. The following description assumes that (1) the channel response matrix is known at the receiver and (2) the channel gains are normalized such that the sum of the variances of the $N_T$ channel gains for each receive antenna is equal to one.

For a MIMO system, a MIMO channel is formed for each user by the transmitter's $N_T$ transmit antennas and that user's $N_R$ receive antennas. The MIMO channel is composed of $N_S$ spatial channels, where $N_S \leq \min \{N_T, N_R\}$. The MIMO system can provide improved performance (e.g., increased transmission capacity and/or greater reliability) if the $N_S$ spatial channels are utilized.

The multiple transmit antennas and multiple receive antennas in the MIMO system may be used to support various spatial processing schemes including a transmit diversity scheme, a spatial multiplexing scheme, a circular transmission scheme, and a per-antenna transmission scheme. These spatial processing schemes are described below.

A. Transmit Diversity

For the transmit diversity scheme, each data symbol is redundantly sent from multiple transmit antennas to achieve greater reliability. The transmit diversity scheme is generally more robust than other spatial processing schemes in terms of error probability.

Figure 5A:
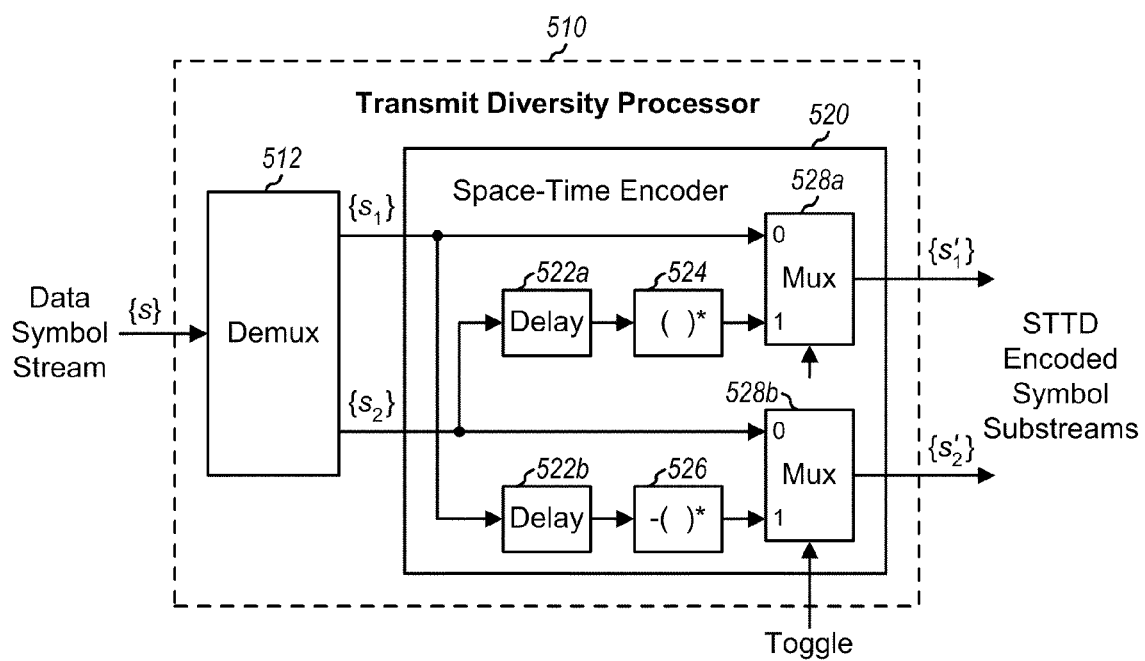
FIGS. 5A and 5B show a transmit diversity processor and a spatial multiplexing processor for the TX spatial processor.

FIG. 5A shows a block diagram of a transmit diversity processor 510, which implements a space-time transmit diversity (STTD) scheme. Transmit diversity processor 510 may be used for TX Div/SM processor 420a and/or TX Div/SM processor 420b in FIG. 4A. Transmit diversity processor 510 may also be used for MISO and MIMO systems.

Within transmit diversity processor 510, a demultiplexer (Demux) 512 receives and demultiplexes the data symbol stream {s}, which may be for the base stream or the enhancement stream, into two data symbol substreams {$s_1$} and {$s_2$}. A space-time encoder 520 then performs STTD encoding of the two substreams {$s_1$} and {$s_2$} and provides two STTD encoded symbol substreams {$s'_1$} and {$s'_2$}. The data symbol stream {s} is provided at the symbol rate, the two data symbol substreams {$s_1$} and {$s_2$} are provided at half the symbol rate, and the STTD encoded symbol substreams {$s'_1$} and {$s'_2$} are provided at the symbol rate.

The STTD encoding may be performed in several ways. For the embodiment shown in FIG. 5A, the data symbol substreams {$s_1$} and {$s_2$} are provided to a "0" input of multiplexers (Mux) 528a and 528b, respectively. The substream {$s_1$} is also delayed one symbol period by a delay unit 522b, inverted and conjugated by a unit 526, and provided to a "1" input of multiplexer 528b. The substream {$s_2$} is also delayed one symbol period by a delay unit 522a, conjugated by a unit 524, and provided to the "1" input of multiplexer 528a. Each of multiplexers 528a and 528b toggles between the "0" and "1" inputs at the symbol rate and provides a respective STTD encoded symbol substream.

For the embodiment shown in FIG. 5A, for each pair of data symbols ($s_1$, $s_2$) received on the two data symbol substreams {$s_1$} and {$s_2$}, space-time encoder 520 provides symbol pair ($s_1$, $s_2$) followed by symbol pair ($s_2^*$, $-s_1^*$), where "*" denotes the complex conjugate. Symbol pair ($s_1$, $s_2$) is sent from the two transmit antennas in the first symbol period, and symbol pair ($s_2^*$, $-s_1^*$) is sent in the second symbol period. For equation set (12), the vector $x(1) = [s_1 \ s_2]^T$ is transmitted in the first symbol period, and the vector $x(2) = [s_2^* \ -s_1^*]^T$ is transmitted in the second symbol period. For example, if the data symbol stream is given as {s} = $s_1 \ s_2 \ s_3 \ s_4 \ s_5 \ s_6 \ldots$, then the data symbol substreams are {$s_1$} = $s_1 \ s_3 \ s_5 \ldots$ and {$s_2$} = $s_2 \ s_4 \ s_6 \ldots$, and the STTD encoded symbol substreams are {$s'_1$} = $s_1 \ s_2^* \ s_3 \ s_4^* \ s_5 \ s_6^* \ldots$ and {$s'_2$} = $s_2 - s_1^* \ s_4 - s_3^* \ s_6 - s_5^* \ldots$.

If a receiver is equipped with a single receive antenna (e.g., for receivers 220c and 220d in MISO system 200b in FIG. 2B), then the received symbols may be expressed as:

$$y(1) = h_1 s_1 + h_2 s_2 + n(1), \text{ and} \qquad \text{Eq (13)}$$

$$y(2) = h_1 s_2^* - h_2 s_1^* + n(2),$$

where y(1) and y(2) are two received symbols for two consecutive symbol periods;
$h_1$ and $h_2$ are the channel gains from the two transmit antennas to the receive antenna, which are assumed to be constant over the 2-symbol period; and
n(1) and n(2) are the noise for the two received symbols y(1) and y(2), respectively.

The receiver may then derive estimates of the two transmitted data symbols, $s_1$ and $s_2$, as follows:

$$\hat{s}_1 = \frac{h_1^* y(1) - h_2 y^*(2)}{|h_1|^2 + |h_2|^2} = s_1 + \frac{h_1^* n(1) - h_2 n^*(2)}{|h_1|^2 + |h_2|^2}, \qquad \text{Eq (14)}$$

and $$\hat{s}_2 = \frac{h_2^* y(1) + h_1 y^*(2)}{|h_1|^2 + |h_2|^2} = s_2 + \frac{h_2^* n(1) + h_1 n^*(2)}{|h_1|^2 + |h_2|^2},$$

where $\hat{s}_1$ and $\hat{s}_2$ are estimates of the data symbols $s_1$ and $s_2$, respectively.

If a receiver is equipped with multiple receive antennas (e.g., for receivers 220e and 220f in MIMO system 200c in FIG. 2C), then the received symbols may be expressed as:

$$y(1) = Hx(1) = h_1 s_1 + h_2 s_2 + n(1), \text{ and} \qquad \text{Eq (15)}$$

$$y(2) = Hx(2) = h_1 s_2^* - h_2 s_1^* + n(2),$$

where y(1) and y(2) are received vectors for two consecutive symbol periods, with each vector including two received symbols for two receive antennas;

$h_1$ and $h_2$ are vectors of channel gains for transmit antennas 1 and 2, respectively (i.e., $H=[h_1\ h_2]$), with each vector including two channel gains from the transmit antenna to the two receive antennas; and n(1) and n(2) are noise vectors for the received vectors y(1) and y(2), respectively.

The receiver can derive estimates of the two transmitted data symbols, $s_1$ and $s_2$, as follows:

$$\hat{s}_1 = \frac{h_1^H \underline{y}(1) - \underline{y}^H(2)h_2}{\|h_1\|^2 + \|h_2\|^2} = s_1 + \frac{h_1^H \underline{n}(1) - \underline{n}^H(2)h_2}{\|h_1\|^2 + \|h_2\|^2}, \quad \text{Eq (16)}$$

and $$\hat{s}_2 = \frac{h_2^H \underline{y}(1) + \underline{y}^H(2)h_1}{\|h_1\|^2 + \|h_2\|^2} = s_2 + \frac{h_2^H \underline{n}(1) + \underline{n}^H(2)h_1}{\|h_1\|^2 + \|h_2\|^2}.$$

STTD is described in further detail by S. M. Alamouti in a paper entitled "A Simple Transmit Diversity Technique for Wireless Communications," IEEE Journal on Selected Areas in Communications, Vol. 16, No. 8, October 1998, pgs. 1451-1458. STTD is also described in U.S. patent application Ser. No. 09/737,602, entitled "Method and System for Increased Bandwidth Efficiency in Multiple Input-Multiple Output Channels," filed Jan. 5, 2001, U.S. patent application Ser. No. 10/179,439, entitled "Diversity Transmission Modes for MIMO OFDM Communication Systems," filed Jun. 24, 2002, and the aforementioned provisional U.S. Patent Application Ser. No. 60/421,309, all of which are assigned to the assignee of the present application.

Transmit diversity may also be implemented in other manners such as, for example, with delay diversity. For simplicity, the following description assumes that transmit diversity is implemented with the STTD scheme shown in FIG. 5A.

B. Spatial Multiplexing

For a spatial multiplexing scheme, each data symbol is sent once, and different data symbols are sent from multiple transmit antennas using the $N_S$ spatial channels to achieve greater capacity. The spatial multiplexing scheme can typically achieve higher data rates than other spatial processing schemes for a given SNR.

Figure 5B:
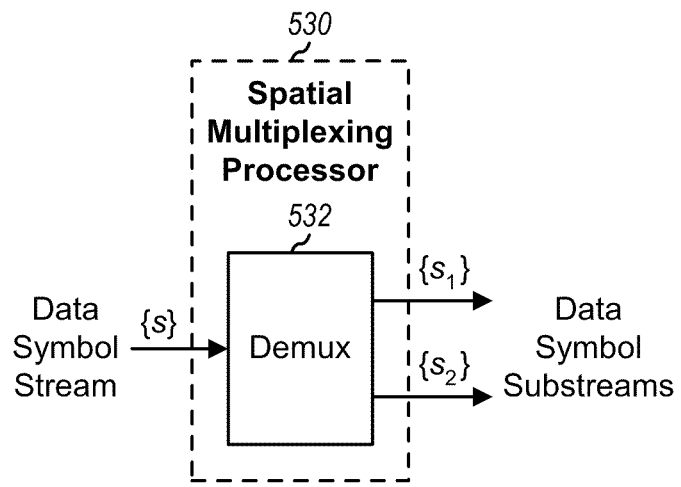

FIG. 5B shows a block diagram of a spatial multiplexing processor 530, which implements an embodiment of the spatial multiplexing scheme. Spatial multiplexing processor 530 may be used for TX Div/SM processor 420a and/or TX Div/SM processor 420b in FIG. 4A for a MIMO system. Within spatial multiplexing processor 530, a demultiplexer 532 receives and demultiplexes the data symbol stream {s} into two data symbol substreams {$s_1$} and {$s_2$}. The symbol substreams {$s_1$} and {$s_2$} are designated for transmission from transmit antennas 324a and 324b, respectively. The same or different rates may be used for the two symbol substreams {$s_1$} and {$s_2$}.

Due to scattering in the communication channel, the two data symbol substreams {$s_1$} and {$s_2$} sent from the two transmit antennas interfere with each other at receiver 220x. Each transmitted data symbol substream is received by both receive antennas 352a and 352b, albeit at different amplitudes and phases. Each of the two received symbol streams {$y_1$} and {$y_2$} includes a component of each of the two transmitted data symbol substreams {$s_1$} and {$s_2$}.

At receiver 220x, various processing techniques may be used to process the two received symbol streams {$y_1$} and {$y_2$} to recover the two transmitted data symbol substreams {$s_1$} and {$s_2$}. These receiver processing techniques include a zero-forcing technique (which is also referred to as a channel correlation matrix inversion (CCMI) technique), a minimum mean square error (MMSE) technique, an MMSE linear equalizer (MMSE-LE) technique, a decision feedback equalizer (DFE) technique, and a successive equalization and interference cancellation (SIC) technique. The zero-forcing technique attempts to decorrelate the individual transmitted data symbol substreams to remove interference from the other data symbol substream. The MMSE technique attempts to maximize the SNR of each recovered data symbol substream in the presence of noise plus interference from the other data symbol substream. These receiver processing techniques are described in detail in U.S. patent application Ser. No. 09/993,087, entitled "Multiple-Access Multiple-Input Multiple-Output (MIMO) Communication System," filed Nov. 6, 2001, and U.S. patent application Ser. No. 09/956,449, entitled "Method and Apparatus for Utilizing Channel State Information in a Wireless Communication System," filed Sep. 18, 2001, both of which are assigned to the assignee of the present application.

Spatial multiplexing may also be implemented in other manners. For simplicity, the following description assumes that spatial multiplexing is implemented with the embodiment shown in FIG. 5B.

C. Other Spatial Processing Schemes

The circular transmission scheme provides a combination of transmit diversity and spatial multiplexing. The circular transmission scheme multiplies the data symbol streams with a transmit basis matrix M to obtain the vector x of transmit symbols, as follows:

$$x = M\Lambda s. \quad \text{Eq (17)}$$

where M is an $\{N_T \times N_T\}$ transmit basis matrix, which is a unitary matrix; and $\Lambda$ is an $\{N_T \times N_T\}$ diagonal matrix.

The diagonal matrix $\Lambda$ contains $\sqrt{\alpha \cdot P}$ and $\sqrt{(1-\alpha) \cdot P}$ along the diagonal and zeros everywhere else. These diagonal entries determine the amount of transmit power to use for the base stream and enhancement stream.

The transmit basis matrix M allows each data symbol stream to be sent from all $N_T$ transmit antennas and further allows the full power of each transmit antenna to be used for data transmission. The transmit basis matrix M may be defined in various manners such as, for example:

$$M = \frac{1}{\sqrt{N_T}} W,$$

where W is a Walsh-Hadamard matrix; or $$M = \frac{1}{\sqrt{N_T}} Q,$$

where Q is a discrete Fourier transform (DFT) matrix.

A receiver can recover the transmitted data symbols as follows:

$$\hat{s} = \Lambda^{-1} R_{e\!f\!f}^{-1} H_{e\!f\!f}^H y = \Lambda^{-1} R_{e\!f\!f}^{-1} H_{e\!f\!f}^H (HM\Lambda s + n) = s + \tilde{n}, \quad \text{Eq (18)}$$

where $H_{e\!f\!f}$ is the effective channel response matrix, which is $H_{e\!f\!f} = HM$ $R_{e\!f\!f}$ is the correlation matrix of $H_{e\!f\!f}$, which is $R_{e\!f\!f} = H_{e\!f\!f}^H H_{e\!f\!f}$, and ñ it is the post-processed noise.

The circular transmission scheme is also referred to as a rate adaptive transmission scheme. The circular transmission scheme for a single-carrier communication system is described in detail in commonly assigned U.S. patent application Ser. No. 10/367,234, entitled "Rate Adaptive Transmission Scheme for MIMO Systems," filed Feb. 14, 2003.

For the per-antenna transmission scheme, the base stream is sent from one transmit antenna and the enhancement stream is sent from another transmit antenna. The per-antenna transmission scheme may be viewed as one form of the spatial multiplexing scheme, where the different data symbols sent from multiple transmit antennas are for different streams.

Other spatial processing schemes may also be implemented, and this is within the scope of the invention.

5. Hierarchical Coding Configurations

The use of multiple transmit antennas and/or multiple receive antennas provides various options for hierarchical coding of the base stream and enhancement stream. For example, the following options are available for hierarchical coding with multiple transmit antennas and multiple receive antennas:

1. The base stream and enhancement stream may be sent with TDM or superposition;
2. The base stream may be sent with transmit diversity or spatial multiplexing; and
3. The enhancement stream may be sent with transmit diversity or spatial multiplexing.

Each of the three options listed above may be made independently. Since there are at least two possible choices for each of these three options, at least eight different configurations are possible for these three options. Other configurations not based on these three options are also possible. The following seven configurations are described in further detail below:

1. TDM—transmit diversity (Div) for both streams;
2. TDM—transmit diversity for the base stream and spatial multiplexing (SM) for the enhancement stream;
3. Superposition—transmit diversity for both streams;
4. Superposition—transmit diversity for the base stream and spatial multiplexing for the enhancement stream;
5. Superposition—spatial multiplexing for both streams;
6. Transmit diversity for both streams without TDM or superposition; and
7. Per-antenna for both streams.

Configurations 6 and 7 are not based on the three options described above. For each of the configurations with superposition, the receiver for user B recovers only the base stream. The receiver for user A recovers the base stream, estimates and removes it from the received signals, and then recovers the enhancement stream.

A. TDM—Transmit Diversity for Both Streams

Figure 6A:
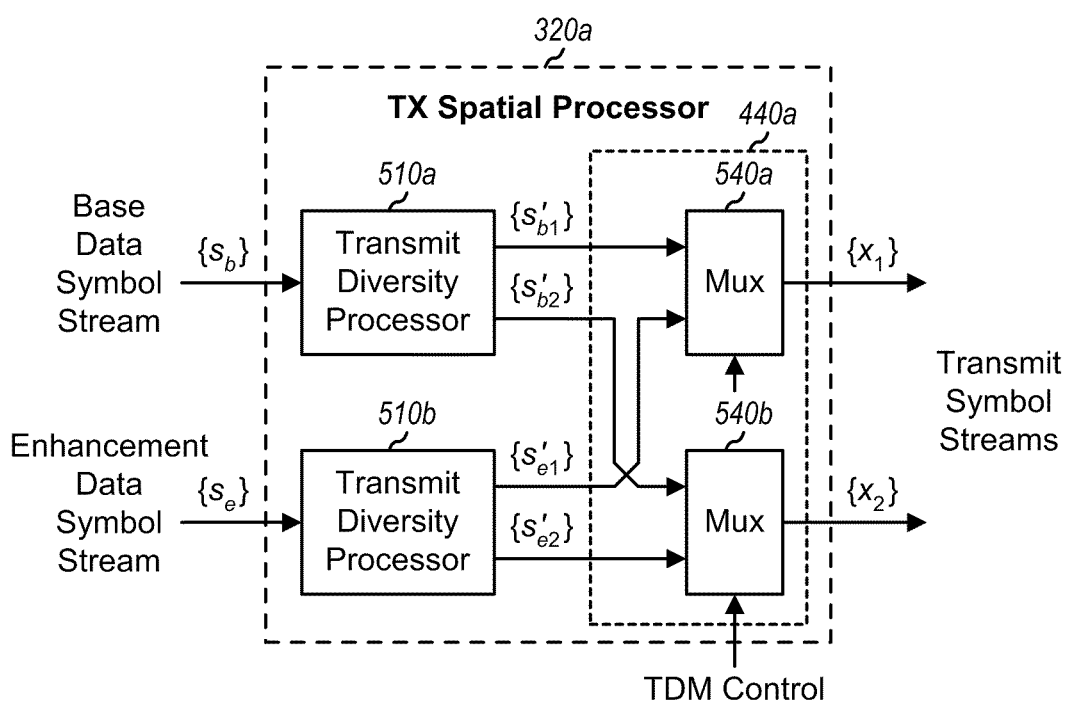
FIG. 6A illustrates a block diagram of a TX spatial processor wherein the base stream and enhancement stream are multiplexed in time and transmitted using transmit diversity.

FIG. 6A shows a block diagram of a TX spatial processor 320a, which supports the configuration whereby the base stream and enhancement stream are multiplexed in time and both streams are transmitted using transmit diversity. TX spatial processor 320a includes transmit diversity processors 510a and 510b and a combiner 440a. Each of transmit diversity processors 510a and 510b may be implemented with transmit diversity processor 510 in FIG. 5A Transmit diversity processor 510a receives and demultiplexes the data symbols $\{s_b\}$ for the base stream into two data symbol substreams $\{s_{b1}\}$ and $\{s_{b2}\}$. Transmit diversity processor 510a then STTD encodes the substreams $\{s_{b1}\}$ and $\{s_{b2}\}$ to obtain two STTD encoded symbol substreams $\{s'_{b1}\}$ and $\{s'_{b2}\}$, which are provided to combiner 440a. Similarly, transmit diversity processor 510b receives and demultiplexes the data symbols $\{s_e\}$ for the enhancement stream into two data symbol substreams $\{s_{e1}\}$ and $\{s_{e2}\}$, and further STTD encodes these substreams to obtain two STTD encoded symbol substreams $\{s'_{e1}\}$ and $\{s'_{e2}\}$, which are also provided to combiner 440a.

Within combiner 440a, a multiplexer 540a receives the substreams $\{s'_{b1}\}$ and $\{s'_{e1}\}$ from transmit diversity processors 510a and 510b, respectively, time division multiplexes these substreams based on a TDM control, and provides the transmit symbol stream $\{x_1\}$. Similarly, a multiplexer 540b receives the substreams $\{s'_{b2}\}$ and $\{s'_{e2}\}$ from transmit diversity processors 510a and 510b, respectively, time division multiplexes these substreams based on the same TDM control, and provides the transmit symbol stream $\{x_2\}$.

Figure 7A:
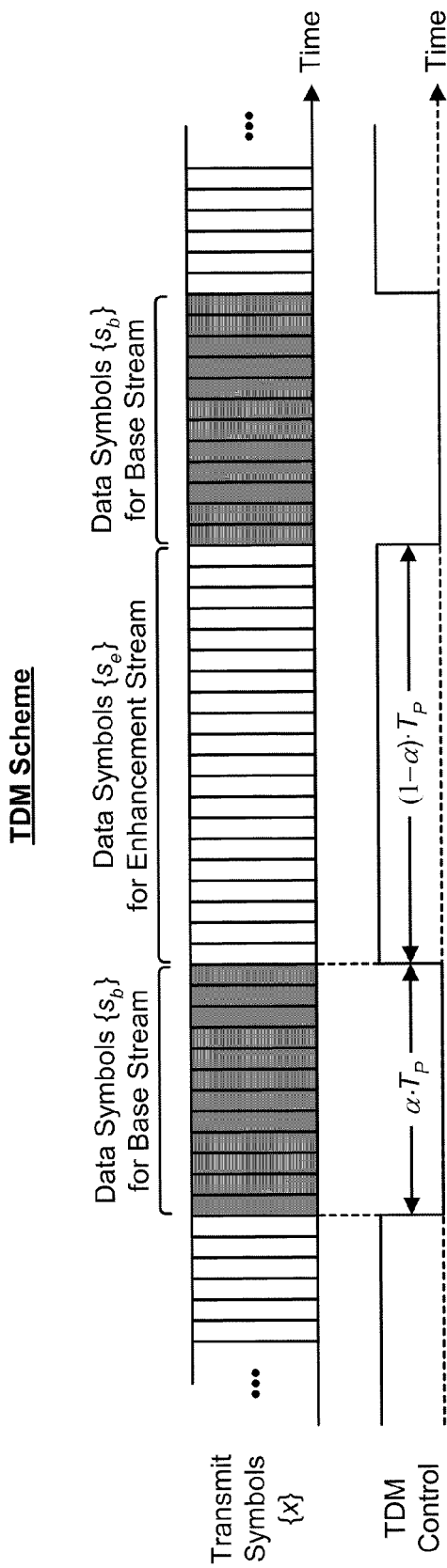
FIGS. 7A and 7B show timing diagrams for the TDM and superposition schemes, respectively.

FIG. 7A shows a timing diagram for the TDM scheme. Each transmit symbol stream from TX spatial processor 320a is composed of data symbols $\{s_b\}$ for the base stream time division multiplexed with data symbols $\{s_e\}$ for the enhancement stream. The TDM control determines when the data symbols for each of the two streams are provided as the transmit symbols $\{x\}$. The TDM control has a periodicity of $T_p$ seconds.

During the time that the base stream is transmitted, each pair of data symbols $s_{b1}$ and $s_{b2}$ for this stream is transmitted by sending symbol pair $(s_{b1}, s_{b2})$ from the two transmit antennas in the first symbol period followed by symbol pair $(s_{b2}^*, -s_{b1}^*)$ in the second symbol period. Similarly, during the time that the enhancement stream is transmitted, each pair of data symbols $s_{e1}$ and $s_{e2}$ for this stream is transmitted by sending symbol pair $(s_{e1}, s_{e2})$ from the two transmit antennas in the first symbol period followed by symbol pair $(s_{e2}^*, -s_{e1}^*)$ in the second symbol period.

At the receiver, the two received signals for the two receive antennas are processed with the appropriate channel response matrix as described above to recover the data symbols for both streams. The maximum rates for users A and B may be expressed as:

$$C_{a,div} = E\left\{\log_2\left(1 + \frac{P \cdot G}{\sigma_a^2}\right)\right\}, \quad \text{Eq (19)}$$

and $$C_{b,div} = E\left\{\log_2\left(1 + \frac{P \cdot G}{\sigma_b^2}\right)\right\},$$

where G is the overall gain for the MIMO channel. For a (2, 2) MIMO system, G is a chi-squared random variable with four degrees of freedom and a mean of two, which may be expressed as: $G=0.5 \cdot (|h_{11}|^2+|h_{12}|^2+|h_{21}|^2+|h_{22}|^2)$. Fourth order diversity is achieved for the data transmission in the (2, 2) MIMO system.

For the TDM scheme, the base stream is sent a fraction of the time and at the rate $C_{b,div}$ so that it can be received by both users A and B. The enhancement stream is sent the remainder of the time and at the rate $C_{a,div}$ since it only needs to be received by user A. The overall rates that may be achieved for users A and B for the TDM scheme in the (2, 2) MIMO system may be expressed as shown in equation set (3), where the rates $C_{a,div}$ and $C_{b,div}$ are substituted for the rates $C_a$ and $C_b$, respectively.

B. TDM—Div for Base Stream and SM for Enhancement Stream

Figure 6B:
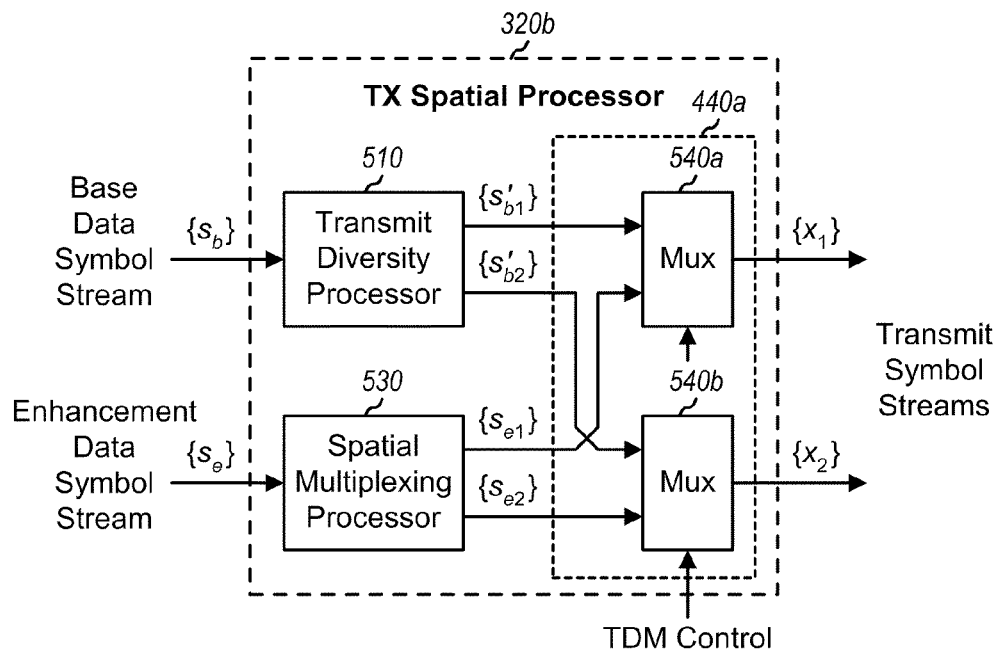
FIG. 6B illustrates a block diagram of a TX spatial processor wherein the base stream and enhancement stream are multiplexed in time, the base stream is transmitted using transmit diversity and the enhancement stream uses spatial multiplexing.

FIG. 6B shows a block diagram of a TX spatial processor 320b, which supports the configuration whereby the base stream and enhancement stream are multiplexed in time, the base stream is sent using transmit diversity, and the enhancement stream is sent using spatial multiplexing. TX spatial processor 320b includes transmit diversity processor 510, spatial multiplexing processor 530, and combiner 440a.

Transmit diversity processor 510 receives and processes the data symbols $\{s_b\}$ for the base stream to obtain two STTD encoded symbol substreams $\{s'_{b1}\}$ and $\{s'_{b2}\}$, which are provided to combiner 440a. Spatial multiplexing processor 530 receives and demultiplexes the data symbols $\{s_e\}$ for the enhancement stream into two data symbol substreams $\{s_{e1}\}$ and $\{s_{e2}\}$, which are also provided to combiner 440a. Within combiner 440a, multiplexer 540a receives the substreams $\{s'_{b1}\}$ and $\{s_{e1}\}$ from processors 510 and 530, respectively, time division multiplexes these substreams based on the TDM control, and provides the transmit symbol stream $\{x_1\}$. Similarly, multiplexer 540b receives the substreams $\{s'_{b2}\}$ and $\{s_{e2}\}$ from processors 510 and 530, respectively, time division multiplexes these substreams based on the TDM control, and provides the transmit symbol stream $\{x_2\}$.

For this configuration, the base stream may be transmitted as described above. The enhancement stream is targeted toward user A having higher SNR and can be recovered successfully by this user. During the time that the enhancement stream is transmitted, each pair of data symbols $s_{e1}$ and $s_{e2}$ for this stream is transmitted by sending the symbol pair $(s_{e1}, s_{e2})$ from the two transmit antennas in one symbol period.

If equal transmit power is used for each data symbol sent with spatial multiplexing to user A, then the maximum rate for the enhancement stream may be expressed as:

$$C_{a,sm} = E\left\{\log_2\left(I + \frac{0.5 \cdot P}{\sigma_a^2} H_a H_a^H\right)\right\}, \qquad \text{Eq (20)}$$

and where $H_a$ is the channel response matrix for user A.

For the TDM scheme, the base stream is sent a fraction of the time and at the rate $C_{b,div}$. The enhancement stream is sent the remainder of the time and at the rate $C_{a,sm}$. The overall rates that may be achieved for users A and B for the TDM scheme may be expressed as shown in equation set (3), where the rates $C_{a,sm}$ and $C_{b,div}$ are substituted for the rates $C_a$ and $C_b$, respectively.

C. Superposition—Transmit Diversity for Both Streams

Figure 6C:
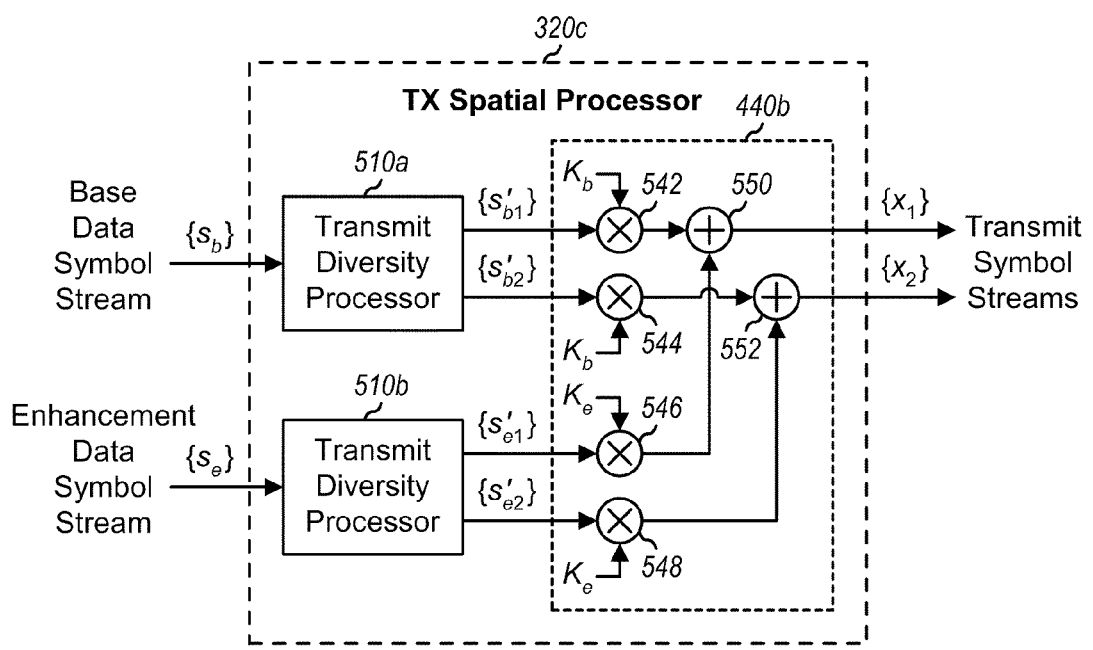
FIG. 6C illustrates a block diagram of a TX spatial processor wherein the base stream and enhancement stream are combined and the combined stream is transmitted using transmit diversity.

FIG. 6C shows a block diagram of a TX spatial processor 320c, which supports the configuration whereby the base stream and enhancement stream are superimposed (i.e., combined) and the combined stream is sent using transmit diversity. TX spatial processor 320c includes transmit diversity processors 510a and 510b and a combiner 440b.

Transmit diversity processor 510a receives and processes the data symbols $\{s_b\}$ for the base stream to obtain two STTD encoded symbol substreams $\{s'_{b1}\}$ and $\{s'_{b2}\}$, which are provided to combiner 440b. Similarly, transmit diversity processor 510b receives and processes the data symbols $\{s_e\}$ for the enhancement stream to obtain two STTD encoded symbol substreams $\{s'_{e1}\}$ and $\{s'_{e2}\}$, which are also provided to combiner 440b.

Within combiner 440b, a multiplier 542 receives and multiplies the STTD encoded symbol substream $\{s'_{e1}\}$ with a scaling factor $K_b$, a multiplier 544 receives and multiplies the STTD encoded symbol substream $\{s'_{b2}\}$ with the scaling factor $K_b$, a multiplier 546 receives and multiplies the STTD encoded symbol substream $\{s'_{e1}\}$ with a scaling factor $K_e$, and a multiplier 548 receives and multiplies the STTD encoded symbol substream $\{s'_{e2}\}$ with the scaling factor $K_e$. The scaling factors $K_b$ and $K_e$ determine the amount of transmit powers used for the base stream and enhancement stream, respectively, and may be defined as:

$$K_b = \sqrt{0.5 \cdot \alpha \cdot P}, \text{ and} \qquad \text{Eq (21)}$$

$$K_e = \sqrt{0.5 \cdot (1-\alpha) \cdot P},$$

where equal transmit power is used for the two transmit antennas;
α is the fraction of transmit power used for the base stream; and
(1−α) is the fraction of transmit power used for the enhancement stream.

A larger fraction of transmit power P is typically allocated to the base stream. However, the amount of transmit power to allocate to each stream may be dependent on various factors, as described below. A summer 550 receives and sums the outputs from multipliers 542 and 546 to obtain the transmit symbol stream $\{x_1\}$. A summer 552 receives and sums the outputs from multipliers 544 and 548 to obtain the transmit symbol stream $\{x_2\}$.

In an alternative implementation of this configuration, the combining is performed first followed by the STTD encoding. For each two-symbol period, two data symbols $s_{b1}$ and $s_{b2}$ for the base stream and two data symbols $s_{e1}$ and $s_{e2}$ for the enhancement stream are combined to obtain two combined symbols $s_{c1}$ and $s_{c2}$, as follows:

$$s_{c1} = K_b \cdot s_{b1} + K_e \cdot s_{e1}, \text{ and} \qquad \text{Eq (22)}$$

$$s_{c2} = K_b \cdot s_{b2} + K_e \cdot s_{e2}.$$

Symbol pair $(s_{c1}, s_{c2})$ is then sent from the two transmit antennas in the first symbol period followed by symbol pair $(s_{c2}^*, -s_{c1}^*)$ in the second symbol period.

For both implementations of this configuration, the overall rates that may be achieved for users A and B may be expressed as:

$$R_b = E\left\{\log_2\left(1 + \frac{\alpha \cdot P \cdot G}{(1-\alpha) \cdot P \cdot G + \sigma_b^2}\right)\right\}, \qquad \text{Eq (23)}$$

and $$R_a = R_b + E\left\{\log_2\left(1 + \frac{(1-\alpha) \cdot P \cdot G}{\sigma_a^2}\right)\right\} = R_b + R_e.$$

Equation set (23) is similar to equation sets (6) and (10), but with a different channel gain G. In particular, the channel gain G has a mean of two when there are two receive antennas and a mean of one when there is only one receive antenna. Since G has a mean of two for a (2, 2) MIMO system, the mean SNR is the same for equation sets (6), (10) and (23). However, fourth order diversity is achieved with two transmit antennas and two receive antennas, whereas only first order diversity is achieved for the SISO system, and second order diversity is achieved for a (1, 2) SIMO system.

Figure 7B:
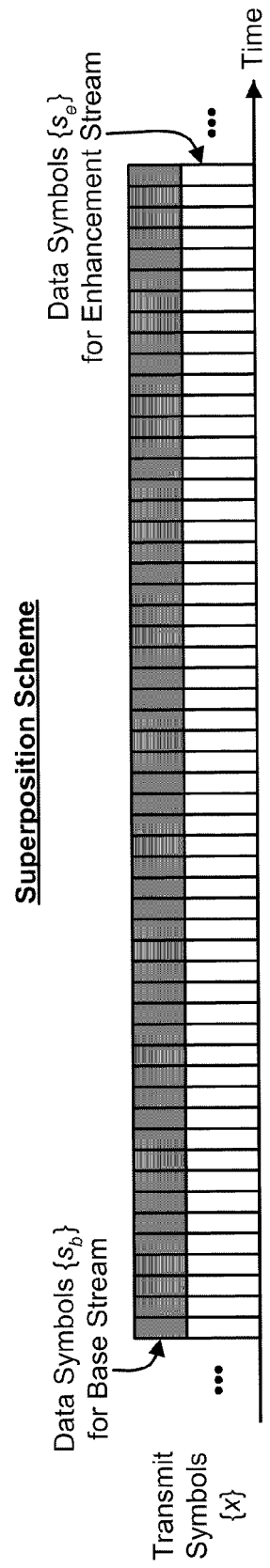

FIG. 7B shows a timing diagram for the superposition scheme. Each of the transmit symbol streams from TX spatial processor 320c is composed of data symbols $\{s_b\}$ for the base stream superimposed on (i.e., added to) data symbols $\{s_e\}$ for the enhancement stream.

D. Superposition—Div for Base Stream and SM for Enhancement Stream

Figure 6D:
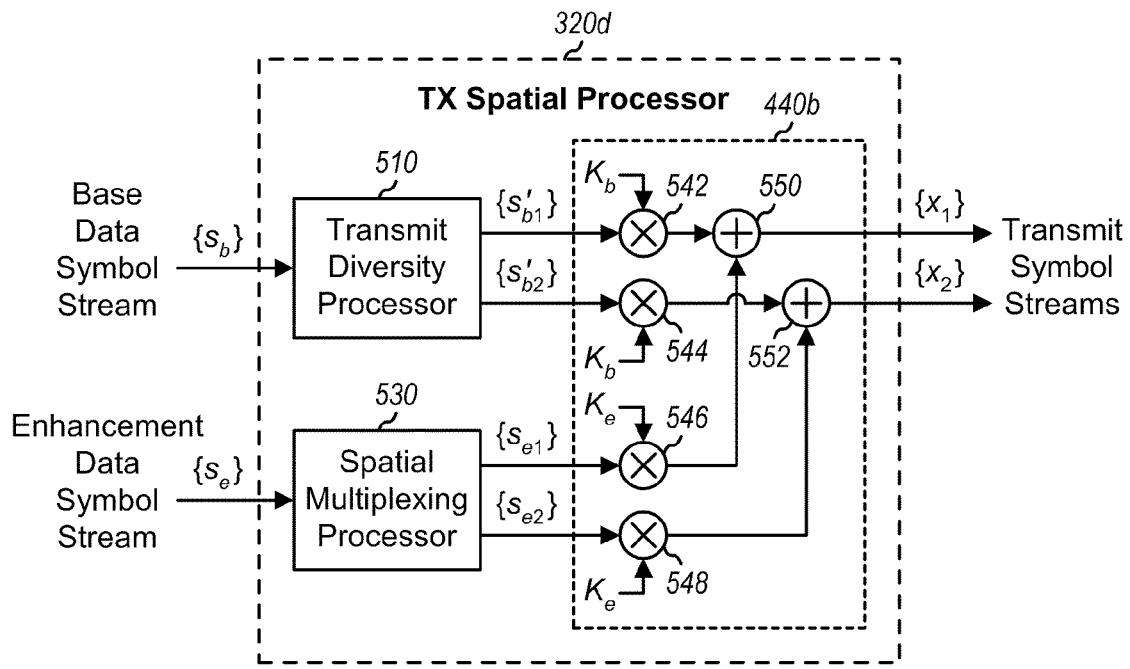
FIG. 6D illustrates a block diagram of a TX spatial processor wherein the base stream and enhancement stream are combined and the base stream is sent using transmit diversity and the enhancement stream uses spatial multiplexing.

FIG. 6D shows a block diagram of a TX spatial processor 320d, which supports the configuration whereby the base stream and enhancement stream are superimposed, the base stream is sent using transmit diversity, and the enhancement stream is sent using spatial multiplexing. TX spatial processor 320d includes transmit diversity processor 510, spatial multiplexing processor 530, and combiner 440b.

Transmit diversity processor 510 receives and processes the data symbols $\{s_b\}$ for the base stream to obtain two STTD encoded symbol substreams $\{s'_{b1}\}$ and $\{s'_{b2}\}$, which are provided to combiner 440b. Spatial multiplexing processor 530 receives and processes the data symbols $\{s_e\}$ for the enhancement stream to obtain two data symbol substreams $\{s_{e1}\}$ and $\{s_{e2}\}$, which are also provided to combiner 440b. Combiner 440b scales the substreams $\{s'_{b1}\}$ and $\{s'_{b2}\}$ with the scaling factor $K_b$, scales the substreams $\{s_{e1}\}$ and $\{s_{e2}\}$ with the scaling factor $K_e$, combines the scaled substream $\{s'_{b1}\}$ with the scaled substream $\{s_{e1}\}$ to obtain the transmit symbol stream $\{x_1\}$, and combines the scaled substream $\{s'_{b2}\}$ with the scaled substream $\{s_{e2}\}$ to obtain the transmit symbol stream $\{x_2\}$.

For the base stream, each pair of data symbols $s_{b1}$ and $s_{b2}$ is transmitted by sending symbol pair $(s_{b1}, s_{b2})$ from the two transmit antennas in the first symbol period followed by symbol pair $(s_{b2}^*, -s_{b1}^*)$ in the second symbol period. For the enhancement stream, two pairs of data symbols are transmitted during the same two-symbol interval by sending symbol pair $(s_{e1}, s_{e2})$ from the two transmit antennas in the first symbol period followed by another symbol pair $(s_{e3}, s_{e4})$ in the second symbol period. The two data symbols $s_{b1}$ and $s_{b2}$ for the base stream and the four data symbols $s_{e1}$ through $s_{e4}$ for the enhancement stream may be combined as follows:

$$x_1 = K_b \cdot s_{b1} + K_e \cdot s_{e1}, \quad \text{Eq (24)}$$

$$x_2 = K_b \cdot s_{b2} + K_e \cdot s_{e2},$$

$$x_3 = K_b \cdot s_{bs}^* + K_e \cdot s_{e3}, \text{ and}$$

$$x_4 = -K_b \cdot s_{b1}^* + K_e \cdot s_{e4},$$

where the transmit symbols $x_1$ and $x_3$ are included in the stream $\{x_1\}$ and the transmit symbols $x_2$ and $x_4$ are included in the stream $\{x_2\}$. Symbol pair $(x_1, x_2)$ is sent from the two transmit antennas in the first symbol period followed by symbol pair $(x_3, x_4)$ in the second symbol period.

The overall rates that may be achieved for users A and B for this configuration may be expressed as:

$$R_b \geq E\left\{\log_2\left(1 + \frac{0.5 \cdot \alpha \cdot P \cdot G}{0.5 \cdot (1-\alpha) \cdot P \cdot G + \sigma_b^2}\right)\right\}, \quad \text{Eq (25a)}$$

and $$R_a = R_b + E\left\{\log_2\left(I + \frac{0.5 \cdot P}{\sigma_a^2} H_a H_a^H\right)\right\} = R_b + R_e. \quad \text{Eq (25b)}$$

The expression for the rate $R_b$ for the base stream in equation (25a) is lower bound because the actual interference contributed by the enhancement stream is slightly less than G. An exact expression can be derived for the base stream rate. However, the bound in equation (25a) is tight and provides a conservative estimate of the capacities for this configuration.

E. Superposition—SM for Both Streams

Figure 6E:
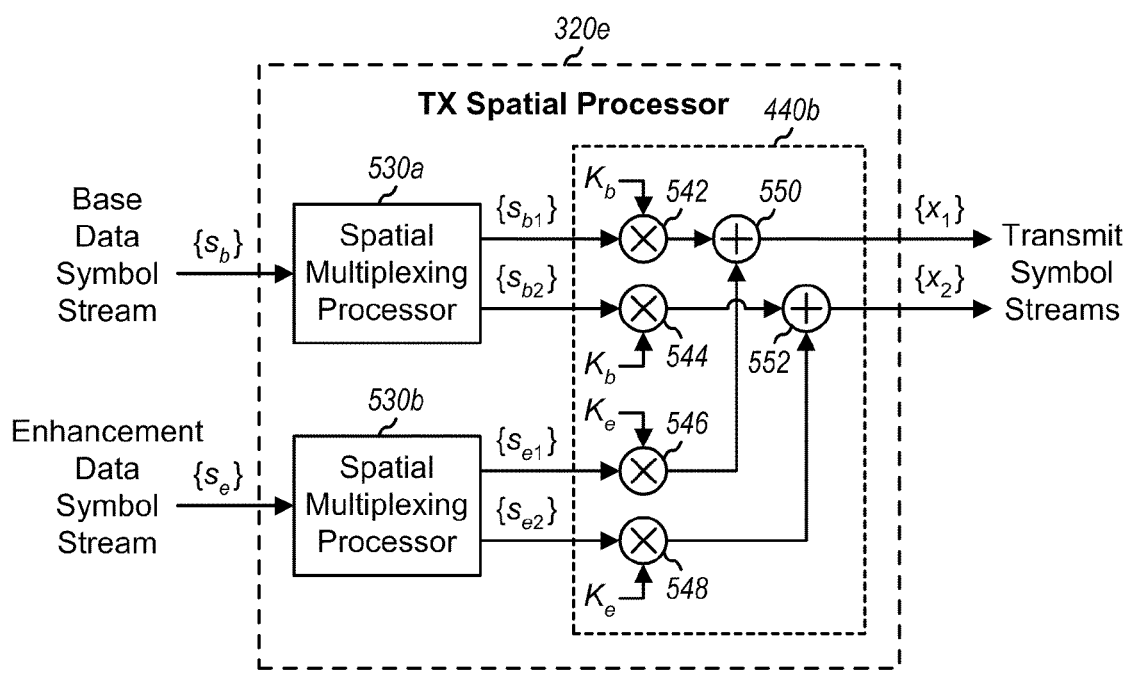
FIG. 6E illustrates a block diagram of a TX spatial processor wherein the base stream and enhancement stream are combined and the combined stream is transmitted using spatial multiplexing.

FIG. 6E shows a block diagram of a TX spatial processor 320e, which supports the configuration whereby the base stream and enhancement stream are superimposed and both streams are sent using spatial multiplexing. TX spatial processor 320e includes spatial multiplexing processors 530a and 530b and combiner 440b.

Spatial multiplexing processor 530a receives and processes the data symbols $\{s_b\}$ for the base stream to obtain two data symbol substreams $\{s_{b1}\}$ and $\{s_{b2}\}$, which are provided to combiner 440b. Spatial multiplexing processor 530b receives and processes the data symbols $\{s_e\}$ for the enhancement stream to obtain data symbol substreams $\{s_{e1}\}$ and $\{s_{e2}\}$, which are also provided to combiner 440b. Combiner 440b scales the substreams $\{s_{b1}\}$ and $\{s_{b2}\}$ with the scaling factor $K_b$, scales the substreams $\{s_{e1}\}$ and $\{s_{e2}\}$ with the scaling factor $K_e$, combines the scaled substream $\{s_{b1}\}$ with the scaled substream $\{s_{e1}\}$ to obtain the transmit symbol stream $\{x_1\}$, and combines the scaled substream $\{s_{b2}\}$ with the scaled substream $\{s_{e2}\}$ to obtain the transmit symbol stream $\{x_2\}$.

For each symbol period, two data symbols $s_{b1}$ and $s_{b2}$ for the base stream and two data symbols $s_{e1}$ and $s_{e2}$ for the enhancement stream are combined as shown in equation set (22) to obtain two transmit symbols $x_1 = s_{c1}$ and $x_2 = s_{c2}$. Symbol pair $(x_1, x_2)$ is sent from the two transmit antennas in one symbol period.

At a receiver, zero-forcing, MMSE, or some other receiver processing technique may be used to separate the data symbols received from the two transmit antennas. Users A and B can both recover the data symbols $s_{b1}$ and $s_{b2}$ for the base stream by treating the enhancement stream as interference. User A can estimate and cancel the interference due to the data symbols $s_{b1}$ and $s_{b2}$ from the received symbols to obtain first modified symbols, then process the first modified symbols to recover the first data symbol $s_{e1}$ for the enhancement stream. User A can next estimate and cancel the interference due to the data symbol $s_{e1}$ from the first modified symbols to obtain second modified symbols, then process the second modified symbols to recover the second data symbol $s_{e2}$ for the enhancement stream. User B recovers only the base stream while user A recovers both streams.

The overall rates that may be achieved for users A and B for this configuration may be expressed as:

$$R_b = E\{\log_2 \quad \text{Eq (26)}$$
$$|I + 0.5 \cdot \alpha \cdot P \cdot H_b H_b^H (0.5 \cdot (1-\alpha) \cdot P \cdot H_b H_b^H + \sigma_b^2 I)^{-1}|\},$$

and $$R_a = R_b + E\left\{\log_2\left(I + \frac{(1-\alpha) \cdot P}{\sigma_a^2} H_b H_b^H\right)\right\} = R_b + R_e.$$

F. Transmit Diversity for Both Streams

Figure 6F:
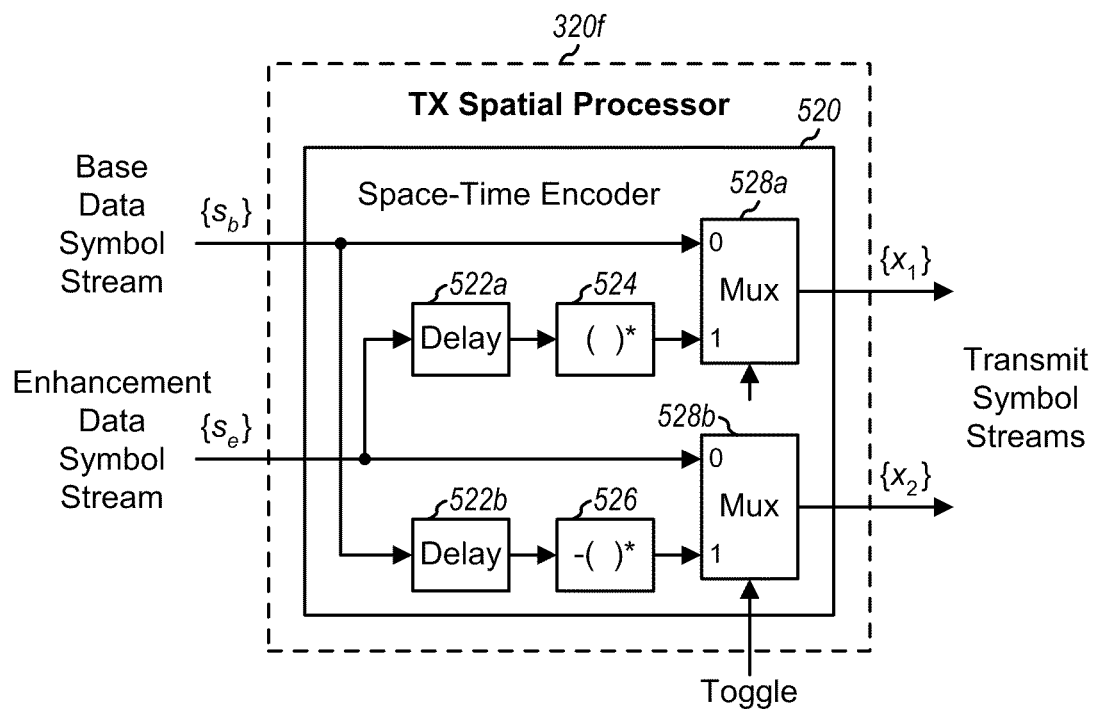
FIG. 6F illustrates a block diagram of a TX spatial processor wherein the base stream and enhancement stream are transmitted using transmit diversity without TDM or being combined.

FIG. 6F shows a block diagram of a TX spatial processor 320f, which supports the configuration whereby the base stream and enhancement stream are sent using transmit diversity without TDM or superposition. TX spatial processor 320f includes space-time encoder 520.

Within space-time encoder 520, the data symbols $\{s_b\}$ for the base stream and the data symbols $\{s_e\}$ for the enhancement stream are provided to the "0" input of multiplexers 528a and 528b, respectively. The data symbol stream $\{s_b\}$ is also delayed one symbol period by delay unit 522b, inverted and conjugated by unit 526, and provided to the "1" input of multiplexer 528b. The data symbol stream $\{s_e\}$ is also delayed one symbol period by delay unit 522a, conjugated by unit 524, and provided to the "1" input of multiplexer 528a. Multiplexers 528a and 528b toggle between the "0" and "1" inputs at the symbol rate and provide the transmit symbol streams $\{x_1\}$ and $\{x_2\}$, respectively.

For the embodiment shown in FIG. 6F, for each pair of data symbols $s_b$ and $s_e$ received on the two data symbol streams $\{s_b\}$ and $\{s_e\}$, space-time encoder 520 provides symbol pair $(s_b, s_e)$ followed by symbol pair $(s_e^*, -s_b^*)$. Symbol pair $(s_b, s_e)$ is sent from the two transmit antennas in the first symbol period, and symbol pair $(s_e^*, -s_b^*)$ is sent in the second symbol period. For example, if the data symbol stream $\{s_b\}$ is composed of $\{s_b\} = s_{b1} \, s_{b2} \, s_{b3} \ldots$ and data symbol stream $\{s_e\}$ is composed of $\{s_e\} = s_{e1} \, s_{e2} \, s_{e3} \ldots$, then the transmit symbol streams are given as $\{x_1\} = s_{b1} \, s_{e1}^* \, s_{b2} \, s_{e2}^* \, s_{b3} \, s_{e3}^* \ldots$ and $\{x_2\} = s_{e1} \, s_{b1}^* \, s_{e2} \, s_{b2}^* \, s_{e3} \, s_{b3}^* \ldots$.

For this configuration, the base stream and enhancement stream are both sent simultaneously using STTD. The STTD processing at the receiver is then relied upon to recover both streams. However, since each data symbol is transmitted over two symbol periods with STTD, the rate of each data symbol stream is reduced by a factor of two. The rate region for this configuration is likely to be worse than the rate region for the configuration with the TDM scheme and transmit diversity for both streams.

G. Per-Antenna—Transmit Diversity for Both Streams

Figure 6G:
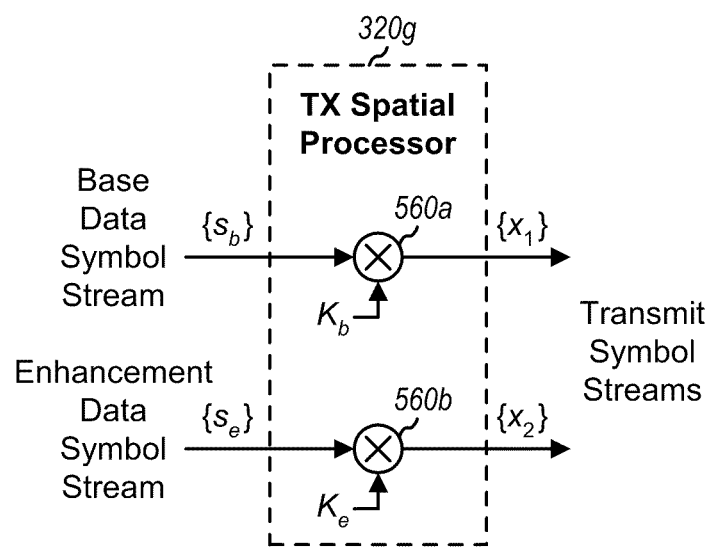
FIG. 6G illustrates a block diagram of a TX spatial processor wherein the base stream is transmitted from one transmit antenna and the enhancement stream is transmitted from a second transmit antenna.

FIG. 6G shows a block diagram of a TX spatial processor 320g, which supports the configuration whereby the base stream is sent from one transmit antenna and the enhancement stream is sent from another transmit antenna. TX spatial processor 320g includes multipliers 560a and 560b. Multiplier 560a receives and multiplies the data symbols $\{s_b\}$ for the base stream with the scaling factor $K_b$ to obtain the transmit symbol stream $\{x_1\}$. Multiplier 560b receives and multiplies the data symbols $\{s_e\}$ for the enhancement stream with the scaling factor $K_e$ to obtain the transmit symbol stream $\{x_2\}$.

For this configuration, the transmit power used for the base stream is $\alpha \cdot P$, and the transmit power used for the enhancement stream is $(1-\alpha) \cdot P$, i.e., unequal powers may be used for the two transmit antennas. A receiver can separate out the two streams using zero-forcing, MMSE, or some other receiver processing technique.

The overall rates that may be achieved for users A and B for this configuration may be expressed as:

$$R_b = E\{\log_2(1 + \alpha \cdot P \cdot \underline{h}_1^H ((1-\alpha) \cdot P \cdot \underline{h}_2 \underline{h}_2^H + \sigma_b^2 I)^{-1} \underline{h}_1)\}, \quad \text{Eq (27)}$$

and $$R_a = R_b + E\left\{\log_2\left(1 + \frac{(1-\alpha) \cdot P}{\sigma_a^2} \underline{h}_2^H \underline{h}_2\right)\right\} = R_b + R_e,$$

where $h_1$ is the vector of channel gains for transmit antenna 1 used to send the base stream and $h_2$ is the vector of channel gains for transmit antenna 2 used to send the enhancement stream, where $H = [h_1 \, h_2]$.

The rate region for this configuration is comparable to the rate region for the configuration with TDM, transmit diversity for the base stream, and spatial multiplexing for the enhancement stream.

H. Performance

Figure 13:
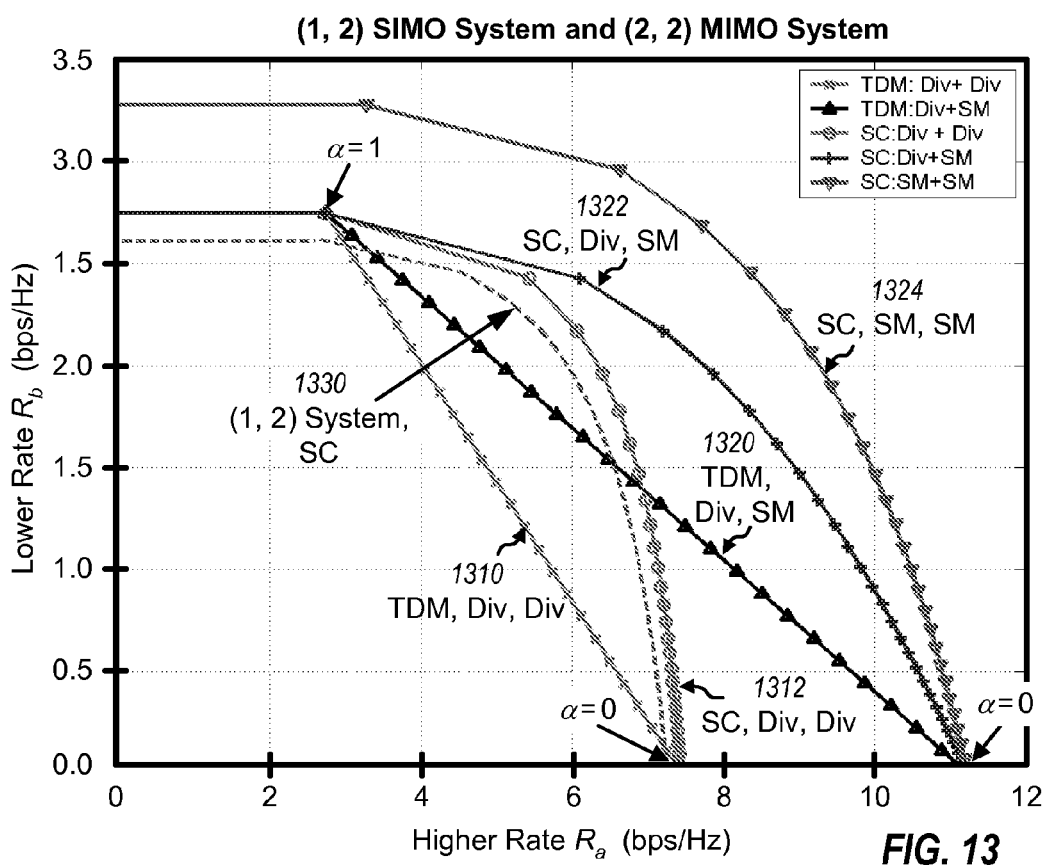
FIG. 13 shows a graph of rate regions for hierarchical coding in the SIMO and MIMO systems.

FIG. 13 shows a graph of the rate regions for six different configurations of hierarchical coding in a (1, 2) SIMO system and a (2, 2) MIMO system with an AWGN channel. The vertical axis represents the rate $R_b$ for user B, which is the rate for the base stream. The horizontal axis represents the rate $R_a$ for user A, which is the combined rate for the base stream and enhancement stream. The rates $R_a$ and $R_b$ are both given in units of bps/Hz. The rates $R_a$ and $R_b$ are also computed with $P/\sigma_a^2 = 20$ dB and $P/\sigma_b^2 = 5$ dB and for a Rayleigh fading channel. Five plots of the achievable rates $R_a$ and $R_b$ are shown in FIG. 13 for five different hierarchical coding configurations in the (2, 2) MIMO system, as follows:

Plot 1310—TDM with transmit diversity (Div) for both streams,

Plot 1312—superposition (SC) with transmit diversity for both streams,

Plot 1320—TDM with transmit diversity for the base stream and spatial multiplexing (SM) for the enhancement stream, Plot 1322—superposition with transmit diversity for the base stream and spatial multiplexing for the enhancement stream, and Plot 1324—superposition with spatial multiplexing for both streams.

As shown by the plots in FIG. 13, when the base stream and enhancement stream are time division multiplexed, spatial multiplexing of the enhancement stream (plot 1320) provides a larger rate region than transmit diversity (plot 1310). When superposition is used, spatial multiplexing for both streams (plot 1324) provides a larger rate region than spatial multiplexing for only the enhancement stream (plot 1322), which in turn provides a larger rate region than transmit diversity for both streams (plot 1312). Superposition with transmit diversity for both streams (plot 1312) is better than TDM with spatial multiplexing for only the enhancement stream (plot 1320) for some values of $\alpha$ between 0.5 and 1.0. The specific values of $\alpha$ for which plot 1312 is better than plot 1320 is dependent on SNR.

As shown in FIG. 13, the superposition scheme generally outperforms the TDM scheme. For the TDM scheme, the rates $R_a$ and $R_b$ are linear functions of $\alpha$. For the superposition scheme, the rate $R_a$ drops more abruptly for $\alpha < 0.5$ because the enhancement stream is dominant and interferes severely with the base stream. The best configuration to use for transmission of the base stream and enhancement stream may be dependent on various factors such as, for example, the relative rates of these two streams, the SNRs achieved by the users, the desired robustness for the base stream and enhancement stream, the desired rates for these streams, and so on.

Plot 1330 of the achievable rates $R_a$ and $R_b$ for the superposition scheme in the (1, 2) SIMO system is also shown in FIG. 13. These rates are computed based on equation set (10).

6. Receiver

Different receiver architectures may be used for the TDM and superposition schemes. Exemplary receiver designs for both schemes are described below.

A. Receivers for TDM Scheme

Figure 8A:
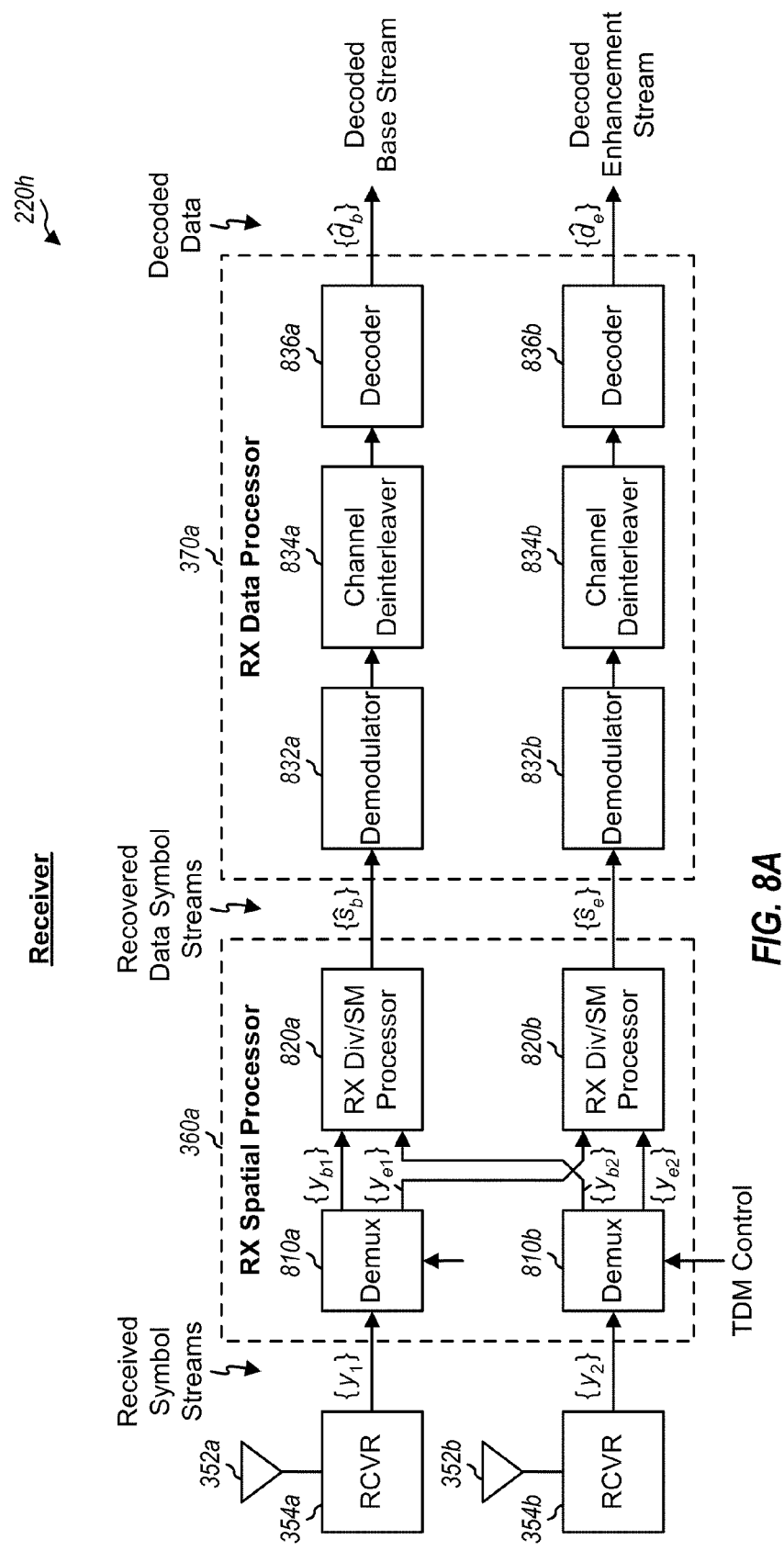
FIGS. 8A and 8B show two receiver designs for the TDM scheme.

FIG. 8A shows a block diagram of a receiver 220h, which is an embodiment of receiver 220x in FIG. 3 and may be used for the TDM scheme. Receiver 220h includes an RX spatial processor 360a and an RX data processor 370a, which are one embodiment of RX spatial processor 360 and RX data processor 370, respectively, in FIG. 3.

Within RX spatial processor 360a, a demultiplexer 810a receives and demultiplexes the received symbol stream $\{y_1\}$ from antenna 352a based on the TDM control and provides two received symbol substreams $\{y_{b1}\}$ and $\{y_{e1}\}$ for the base stream and enhancement stream, respectively. Similarly, a demultiplexer 810b receives and demultiplexes the received symbol stream $\{y_2\}$ from antenna 352b based on the TDM control and provides two received symbol substreams $\{y_{b2}\}$ and $\{y_{e2}\}$ for the base stream and enhancement stream, respectively.

An RX Div/SM processor 820a receives and processes the substreams $\{y_{b1}\}$ and $\{y_{b2}\}$ for the base stream and provides the recovered data symbol stream $\{\hat{s}_b\}$. If transmit diversity is used for the base stream, then RX Div/SM processor 820a performs the spatial processing shown in equation set (14) if the receiver is equipped with a single antenna or the spatial processing shown in equation set (16) if the receiver is equipped with multiple antennas. If spatial multiplexing is used for the base stream, then RX Div/SM processor 820a may implement the zero-forcing or MMSE-based successive interference cancellation, or some other receiver processing technique. Similarly, an RX Div/SM processor 820b receives and processes the substreams $\{y_{e1}\}$ and $\{y_{e2}\}$ for the enhancement stream and provides the recovered data symbol stream $\{\hat{s}_e\}$. RX Div/SM processor 820b also performs the processing shown in equation set (14) or (16) if transmit diversity is used for the enhancement stream. RX Div/SM processor 820b may implement the zero-forcing or MMSE-based successive interference cancellation, or some other receiver processing technique if spatial multiplexing is used for the enhancement stream. In general, the spatial processing by RX Div/SM processors 820a and 820b is complementary to the spatial processing by TX Div/SM processors 420a and 420b, respectively, in FIG. 4A.

Within RX data processor 370a, a demodulator 832a demodulates the recovered data symbols $\{\hat{s}_b\}$ for the base stream, a channel deinterleaver 834a deinterleaves the demodulated data from demodulator 832a, and a decoder 836a decodes the deinterleaved data from deinterleaver 834a to obtain decoded data $\{\hat{d}_b\}$ for the base stream. Similarly, a demodulator 832b demodulates the recovered data symbols $\{\hat{s}_e\}$ for the enhancement stream, a channel deinterleaver 834b deinterleaves the demodulated data from demodulator 832b, and a decoder 836b decodes the deinterleaved data from deinterleaver 834b to obtain decoded data $\{\hat{d}_e\}$ for the enhancement stream. In general, receiver 220x performs demodulation, deinterleaving, and decoding for each stream in a complementary manner to the modulation, interleaving, and encoding performed for that stream by transmitter 210x.

Figure 8B:
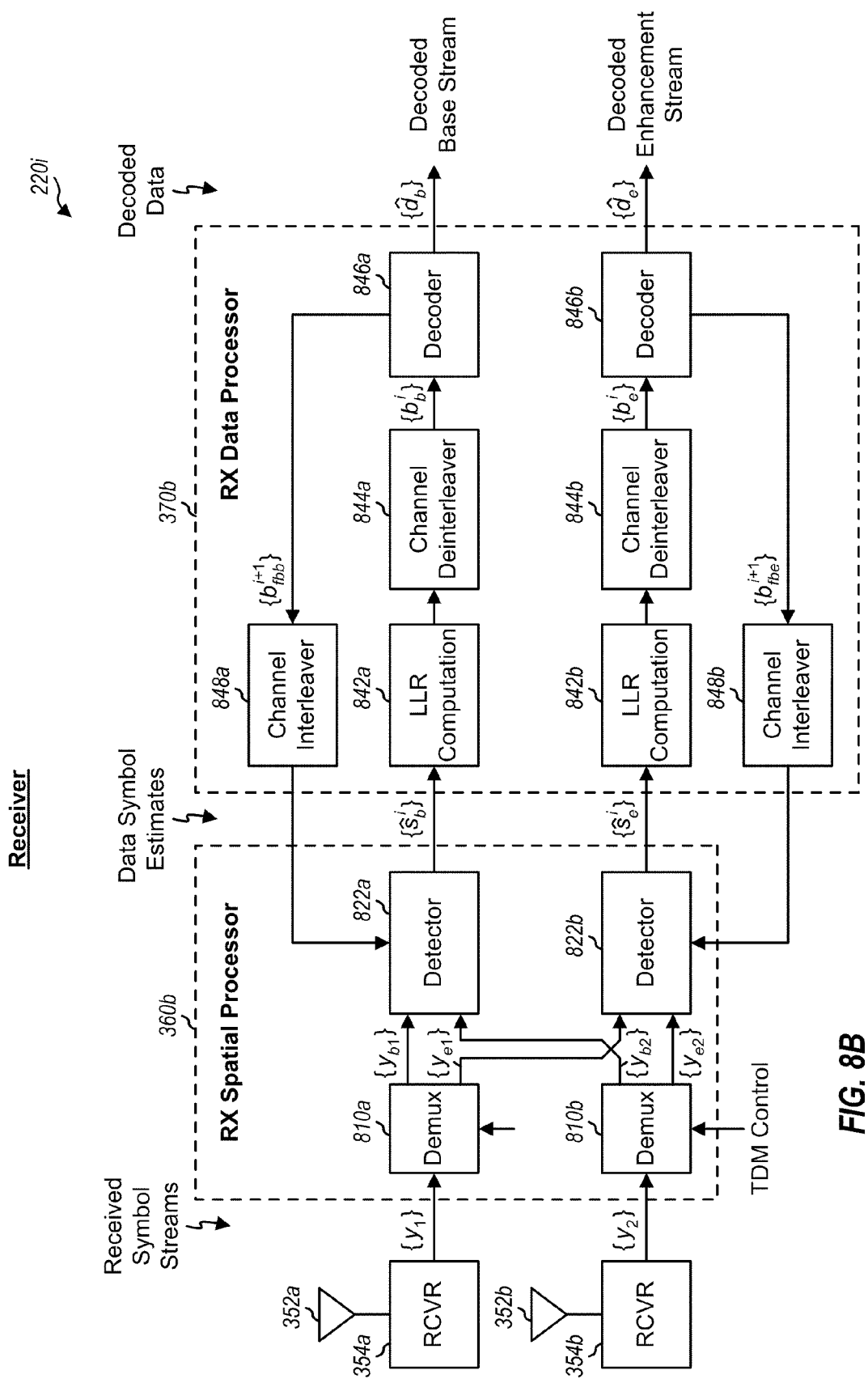

FIG. 8B shows a block diagram of a receiver 220i, which is another embodiment of receiver 220x in FIG. 3 and may also be used for the TDM scheme. Receiver 220i implements an iterative detection and decoding (IDD) scheme to recover the base stream and enhancement stream. The IDD scheme may be used in conjunction with the coding scheme shown in FIG. 4B, which codes each data packet for the base stream or enhancement stream into three parts—data bits $\{c_{data}\}$, first parity bits $\{c_{p1}\}$, and second parity bits $\{c_{p2}\}$.

Receiver 220i includes a detector and a decoder that perform iterative detection and decoding on the received symbols from all receive antennas for each data stream to obtain decoded data for that stream. The iterative detection and decoding exploits the error correction capabilities of the channel code to provide improved performance. This is achieved by iteratively passing soft a priori information between the detector and the decoder, as described in further detail below. Iterative detection and decoding is performed on one received data packet at a time.

Receiver 220i includes an RX spatial processor 360b and an RX data processor 370b. For clarity, the iterative detection and decoding is specifically described below for the base stream. Within RX spatial processor 360b, demultiplexers 810a and 810b receive and demultiplex the received symbol streams $\{y_1\}$ and $\{y_2\}$, respectively, as described above for FIG. 8A. A detector 822a obtains the received symbol substreams $\{y_{b1}\}$ and $\{y_{b2}\}$ for the base stream and performs spatial processing on these substreams. Detector 822a may perform processing for transmit diversity, as described above, or may implement the zero-forcing technique, the MMSE technique, or some other receiver processing technique for spatial multiplexing. Detector 822a provides data symbol estimates $\{\hat{s}_b^i\}$ for the data packet being recovered. The superscript i in $\{\hat{s}_b^i\}$ denotes the detection/decoding iteration number. For the first iteration (i.e., i=1) the data symbol estimates $\{\hat{s}_b^1\}$ are detected based solely on the received symbols $\{y_{b1}\}$ and $\{y_{b2}\}$ since no feedback information is available from the decoder.

Within RX data processor 370b, a log-likelihood ratio (LLR) computation unit 842a receives the data symbol estimates $\{\hat{s}_b^i\}$ and computes the LLRs of the code bit(s) that form each data symbol in the data packet being recovered. A channel deinterleaver 844a then deinterleaves the LLRs from unit 842a and provides the LLRs $\{b_b^i\}$ for the data packet. A decoder 846a receives and decodes the LLRs $\{b_b^i\}$ from channel deinterleaver 844a, as described below.

Figure 8C:
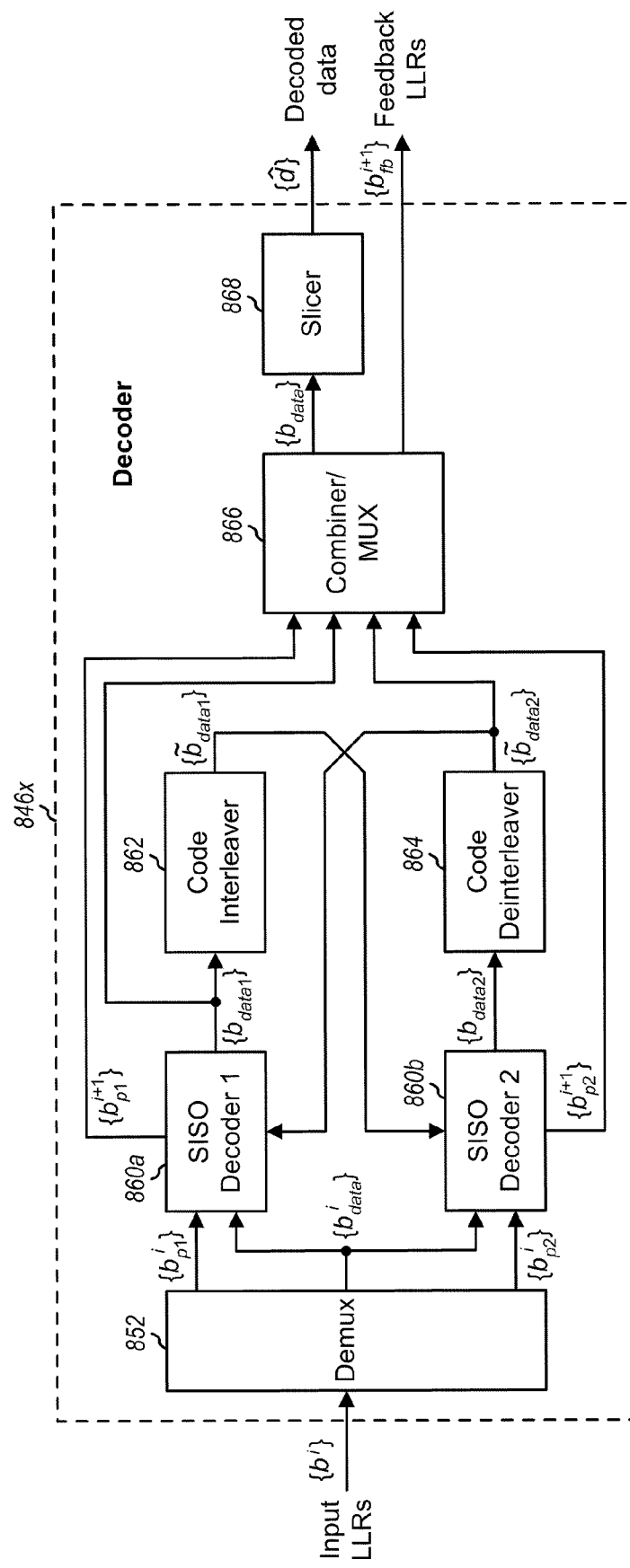
FIG. 8C shows a block diagram of a Turbo decoder.

FIG. 8C shows a block diagram of a Turbo decoder 846x, which may be used for each of decoders 846a and 846b in FIG. 8B. Turbo decoder 846x performs iterative decoding for a parallel concatenated convolutional code, such as the one shown in FIG. 4B.

Within Turbo decoder 846x, a demultiplexer (Demux) 852 receives and demultiplexes the LLRs $\{b^i\}$ from channel deinterleaver 844 (i.e., the input LLRs) into data bit LLRs $\{b_{data}^i\}$, first parity bit LLRs $\{b_{p1}^i\}$, and second parity bit LLRs $\{b_{p2}^i\}$. A soft-input soft-output (SISO) decoder 860a receives the data bit LLRs $\{b_{data}^i\}$ and the first parity bit LLRs $\{b_{p1}^i\}$ from demultiplexer 852 and deinterleaved data bit LLRs $\{\tilde{b}_{data2}\}$ from a code deinterleaver 864. SISO decoder 860a then derives new LLRs for the data and first parity bits, $\{b_{data1}\}$ and $\{b_{p1}\}$, based on the first constituent convolutional code. A code interleaver 862 interleaves the data bit LLRs $\{b_{data1}\}$ in accordance with the code interleaving scheme used at the transmitter and provides interleaved data bit LLRs $\{\tilde{b}_{data1}\}$. Similarly, a SISO decoder 860b receives the data bit LLRs $\{b_{data}^i\}$ and the second parity bit LLRs $\{b_{p2}^i\}$ from demultiplexer 852 and the interleaved data bit LLRs $\{\tilde{b}_{data1}\}$. SISO decoder 860b then derives new LLRs for the data and second parity bits, $\{b_{data2}\}$ and $\{b_{p2}\}$, based on the second constituent convolutional code. Code deinterleaver 864 deinterleaves the data bit LLRs $\{b_{data2}\}$ in a complementary manner to the code interleaving and provides the deinterleaved data bit LLRs $\{\tilde{b}_{data2}\}$. SISO decoders 860a and 860b may implement a BCJR SISO maximum a posteriori (MAP) algorithm or its lower complexity derivatives or a soft-output Viterbi (SOV) algorithm, all of which are known in the art.

The decoding by SISO decoders 860a and 860b may be performed once or may be iterated multiple times for the current detection/decoding iteration i. After all of the decoding iterations have been completed, a combiner/multiplexer 866 receives the final data bit LLRs $\{b_{data1}\}$ and the final first parity bit LLRs $\{b_{p1}^{i+1}\}$ from SISO decoder 860a, the deinterleaved final data bit LLRs $\{\tilde{b}_{data2}\}$ from code deinterleaver 864, and the final second parity bit LLRs $\{b_{p2}^{i+1}\}$ from SISO decoder 860b. Combiner/multiplexer 866 then provides the feedback LLRs $\{b_{fb}^{i+1}\}$ for the next detection/decoding iteration i+1 to detector 822. The feedback LLRs are computed as $\{b_{fp}^{i+1}\}=\{b_{data1}+\tilde{b}_{data2}, b_{p1}^{i+1}, b_{p2}^{i+1}\}$. The feedback LLRs are used to update the detector operation for the next iteration. After all of the detection/decoding iterations have been completed, combiner/multiplexer 866 provides the final data bit LLRs $\{b_{data}\}$, which are obtained as $\{b_{data}\}=\{b_{data}^r+b_{data1}+\tilde{b}_{data2}\}$, where $\{b_{data}^r\}$ is the data bit LLRs provided by detector 822 for the first detection/decoding iteration (i.e., $\{b_{data}^r\}=\{b_{data}^1\}$). A slicer 868 slices the final data bit LLRs $\{b_{data}\}$ and provides the decoded data $\{\hat{d}\}$ for the data packet being recovered.

Referring back to FIG. 8B, the feedback LLRs $\{b_{fbb}^{i+1}\}$ from decoder 846a are interleaved by a channel interleaver 848a and the interleaved feedback LLRs are provided to detector 822a. Detector 822a derives new data symbol estimates $\{\hat{s}_b^{i+1}\}$ based on the received symbols $\{y_{b1}\}$ and $\{y_{b2}\}$ for the base stream and the feedback LLRs $\{b_{fbb}^{i+1}\}$. The data symbol estimates $\{\hat{s}_b^{i+1}\}$ are again decoded by RX data processor 370b as described above. The detection and decoding process may be iterated multiple times. During the iterative detection and decoding process, the reliability of the data symbol estimates improves with each iteration.

The iterative detection and decoding scheme provides various advantages. For example, the IDD scheme supports the use of one data rate for the base stream and one data rate for the enhancement stream. The IDD scheme can be combined with the MIMO-OFDM transmission technique to combat frequency selective fading. Moreover, the iterative detection and decoding process may be flexibly used with any encoder and a corresponding soft-input soft-output decoder, including the parallel concatenated convolutional code described in FIG. 4B. Iterative detection and decoding for a MIMO system is described in further detail in commonly assigned U.S. patent application Ser. No. 10/005,104, entitled "Iterative Detection and Decoding for a MIMO-OFDM system," filed Dec. 3, 2001.

B. Receivers for Superposition Scheme

Figure 9A:
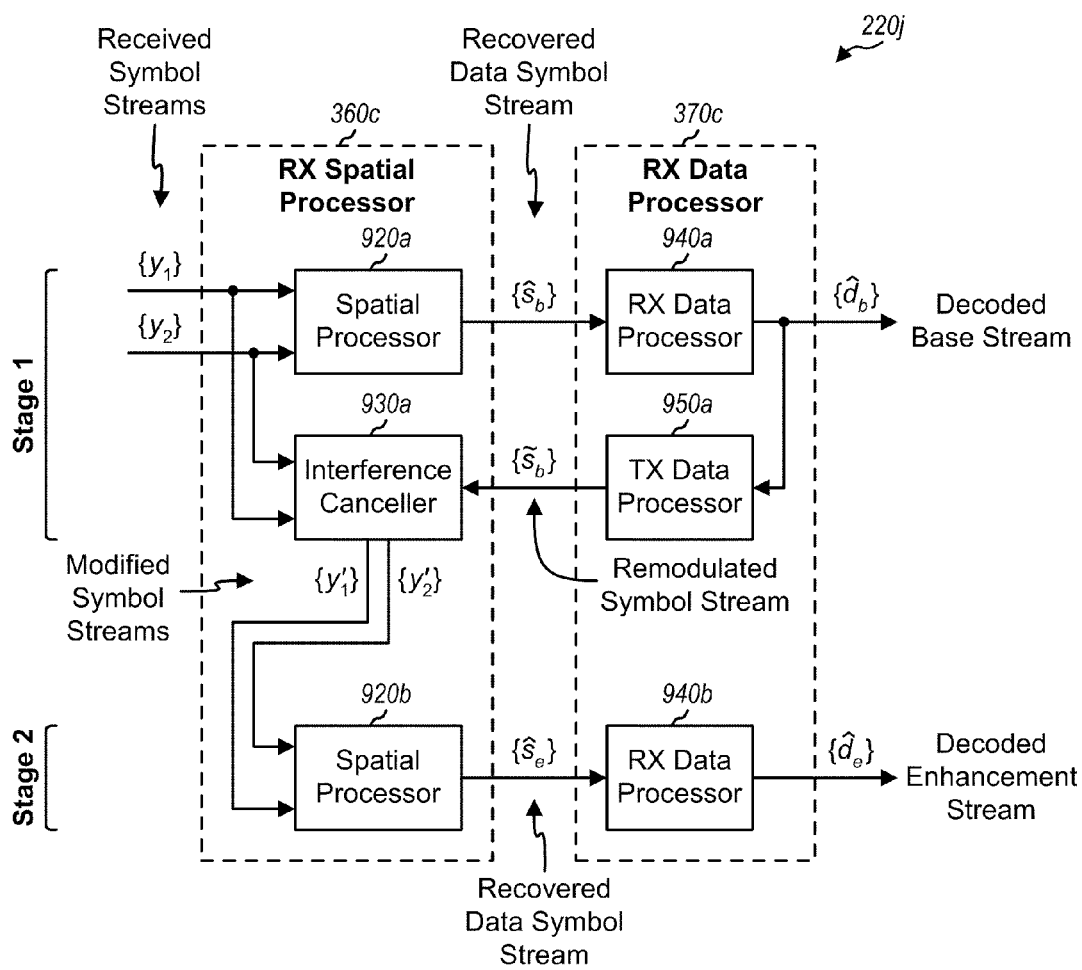
FIGS. 9A and 9B show two receiver designs for the superposition scheme.

FIG. 9A shows a block diagram of a receiver 220j, which is yet another embodiment of receiver 220x in FIG. 3 and may be used for the superposition scheme. Receiver 220j includes an RX spatial processor 360c and an RX data processor 370c. RX spatial processor 360c and RX data processor 370c, which are another embodiment of RX spatial processor 360 and RX data processor 370 in FIG. 3, implement the successive equalization and interference cancellation technique. RX spatial processor 360c and RX data processor 370c include two successive (i.e., cascaded) receiver processing stages. Stage 1 includes a spatial processor 920a, an interference canceller 930a, an RX data processor 940a, and a TX data processor 950a. Stage 2 includes only spatial processor 920b and RX data processor 940b.

For stage 1, spatial processor 920a processes the two received symbol streams $\{y_1\}$ and $\{y_2\}$ to obtain the recovered data symbol stream $\{\hat{s}_b\}$ for the base stream. Spatial processor 920a may implement the zero-forcing or MMSE-based successive interference cancellation, or some other receiver processing technique. RX data processor 940a demodulates, deinterleaves, and decodes the recovered data symbol stream $\{\hat{s}_b\}$ to obtain decoded data $\{\hat{d}_b\}$ for the base stream. TX data processor 950a encodes, interleaves, and modulates the decoded base stream data $\{\hat{d}_b\}$ to obtain a remodulated symbol stream $\{\tilde{s}_b\}$, which is an estimate of the data symbol stream $\{s_b\}$ for the base stream. TX data processor 950a performs the same processing as encoder 412a, channel interleaver 414a, and modulator 416a at transmitter 210x in FIG. 4A. Interference canceller 930a receives and spatially processes the remodulated symbol stream $\{\tilde{s}_b\}$ in the same manner performed by transmitter 210x for the base stream (e.g., a transmit diversity scheme or a spatial multiplexing scheme) to obtain transmit symbol streams $\{\tilde{x}_{b1}\}$ and $\{\tilde{x}_{b2}\}$, which contain only the transmit symbol components for the base stream data for the two transmit antennas. Interference canceller 930a further processes the streams $\{\tilde{x}_{b1}\}$ and $\{\tilde{x}_{b2}\}$ with the channel response matrix to obtain interference components $\{i_{b1}\}$ and $\{i_{b2}\}$ due to the base stream. The interference components $\{i_{b1}\}$ and $\{i_{b2}\}$ are then subtracted from the received symbol streams $\{y_1\}$ and $\{y_2\}$ to obtain modified symbol streams $\{y'_1\}$ and $\{y'_2\}$, which are provided to stage 2.

For stage 2, spatial processor 920b processes the modified symbol streams $\{y'_1\}$ and $\{y'_2\}$ to obtain the recovered data symbol stream $\{\hat{s}_e\}$ for the enhancement stream. Spatial processor 920b may also implement the zero-forcing, MMSE, or some other receiver processing technique. RX data processor 940b then demodulates, deinterleaves, and decodes the recovered data symbol stream $\{\hat{s}_e\}$ to obtain decoded data $\{\hat{d}_e\}$ for enhancement stream.

The two stages of receiver 220x perform successive equalization/spatial processing. In particular, stage 1 performs spatial processing on the received symbol streams $\{y_1\}$ and $\{y_2\}$, and stage 2 performs spatial processing on the modified symbol streams $\{y'_1\}$ and $\{y'_2\}$. Interference cancellation is performed within each stage by the spatial processing to recover the multiple data symbol substreams sent from the multiple transmit antennas for the base stream or enhancement stream being recovered in that stage. Interference cancellation is also performed between the two stages, i.e., on the received symbol streams $\{y_1\}$ and $\{y_2\}$ for stage 1 to obtain the modified symbol streams $\{y'_1\}$ and $\{y'_2\}$ for stage 2. The successive equalization and interference cancellation technique is described in detail in commonly assigned U.S. patent application Ser. No. 09/854,235, entitled "Method and Apparatus for Processing Data in a Multiple-Input Multiple-Output (MIMO) Communication System Utilizing Channel State Information," filed May 11, 2001.

Figure 9B:
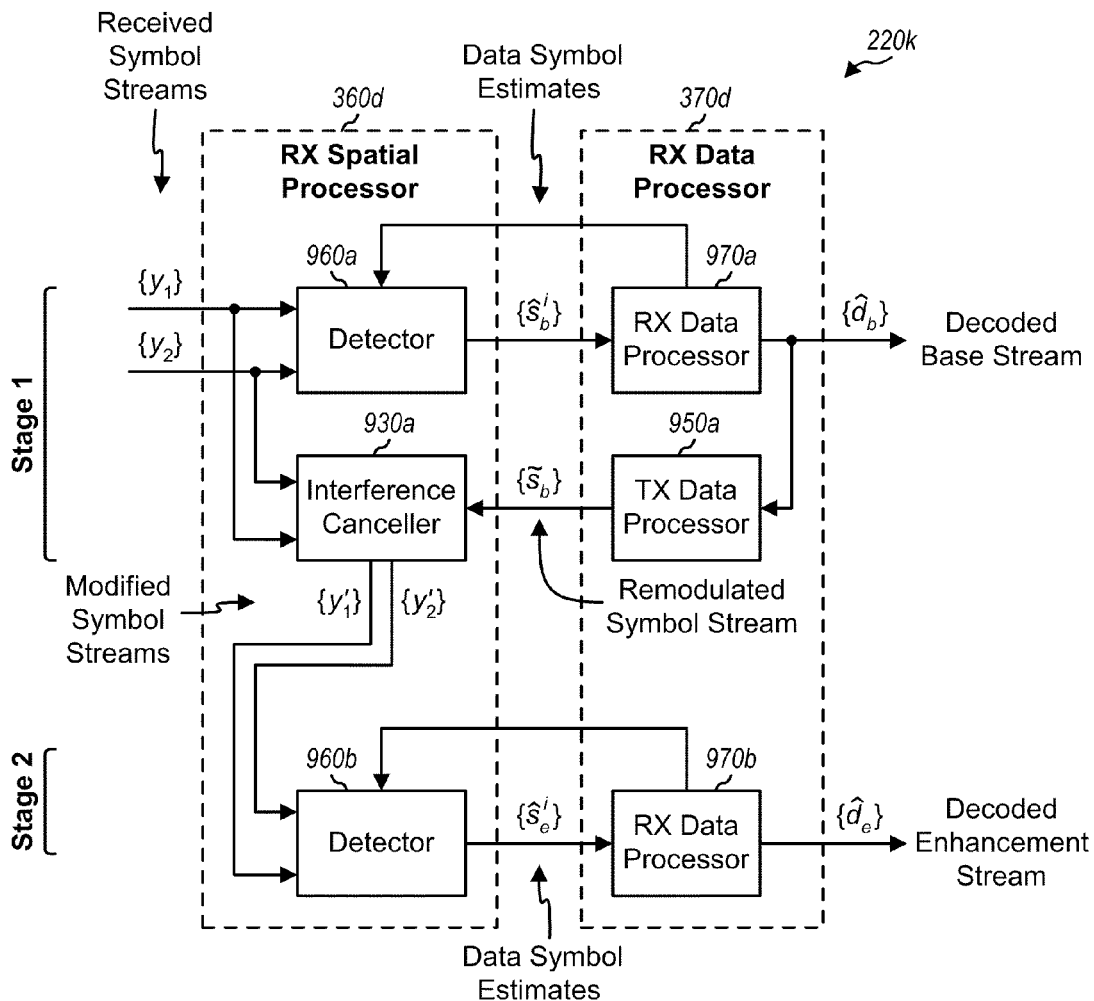

FIG. 9B shows a block diagram of a receiver 220k, which is yet another embodiment of receiver 220x in FIG. 3 and may also be used for the superposition scheme. Receiver 220k performs (1) iterative detection and decoding to recover each of the base stream and enhancement stream and (2) interference cancellation before recovering the enhancement stream.

Receiver 220k includes an RX spatial processor 360d and an RX data processor 370d that include two successive (i.e., cascaded) receiver processing stages. Stage 1 includes a detector 960a, interference canceller 930a, an RX data processor 970a, and TX data processor 950a. Stage 2 includes only a detector 960b and an RX data processor 970b. RX data processors 970a includes LLR computation unit 842a, channel deinterleaver 844a, decoder 846a, and channel interleaver 848a coupled as shown in FIG. 8B. RX data processors 970b includes LLR computation unit 842b, channel deinterleaver 844b, decoder 846b, and channel interleaver 848b.

For stage 1, detector 960a processes the two received symbol streams $\{y_1\}$ and $\{y_2\}$ to obtain the data symbol estimates $\{\hat{s}_b^i\}$ for the base stream. Detector 960a may implement the zero-forcing technique, the MMSE technique, or some other receiver processing technique. RX data processor 970a receives the data symbol estimates $\{\hat{s}_b^i\}$ for the current iteration i, computes the LLRs of the code bits for the data symbol estimate $\{\hat{s}_b^i\}$, performs channel deinterleaving of the LLRs, and decodes the deinterleaved LLRs $\{b_b^i\}$ to obtain feedback LLRs $\{b_{fbb}^{i+1}\}$ for the next iteration i+1. RX data processor 970a further performs channel interleaving of the feedback LLRs $\{b_{fbb}^{i+1}\}$ and provides the interleaved feedback LLRs to detector 960a. The detection and decoding may be iterated multiple times until sufficient confidence is attained for the data bit LLRs. At such time, RX data processor 970a slices the final data bit LLRs $\{b_{data,b}\}$ and provides the decoded data $\{\hat{d}_b\}$ for the base stream.

TX data processor 950a encodes, interleaves, and modulates the decoded data $\{\hat{d}_b\}$ to obtain the remodulated symbol stream $\{\tilde{s}_b\}$. Interference canceller 930a receives and processes the remodulated symbol stream $\{\tilde{s}_b\}$ to obtain interference components $\{i_{b1}\}$ and $\{i_{b2}\}$ due to the base stream. Interference canceller 930a then subtracts the interference components $\{i_{b1}\}$ and $\{i_{b2}\}$ from the received symbol streams $\{y_1\}$ and $\{y_2\}$ to obtain the modified symbol streams $\{y'_1\}$ and $\{y'_2\}$ for stage 2.

For stage 2, detector 960b processes the modified symbol streams $\{y'_1\}$ and $\{y'_2\}$ to obtain data symbol estimates $\{\hat{s}_e^i\}$ for the enhancement stream. RX data processor 970b then deinterleaves and decodes the data symbol estimates $\{\hat{s}_e^i\}$ to obtain decoded data $\{\hat{d}_e\}$ for enhancement stream. Detector 960b and RX data processor 970b operate in similar manner as detector 960a and RX data processor 970a, respectively. Iterative detection and decoding with successive equalization and interference cancellation is also described in the aforementioned U.S. patent application Ser. No. 10/005,104.

FIGS. 8A, 8B, 9A and 9B show four exemplary receiver designs that may be used to recover the base stream and enhancement stream. Other receiver designs may also be used, and this is within the scope of the invention.

7. Transmitter and Receiver Processing

Figure 10:
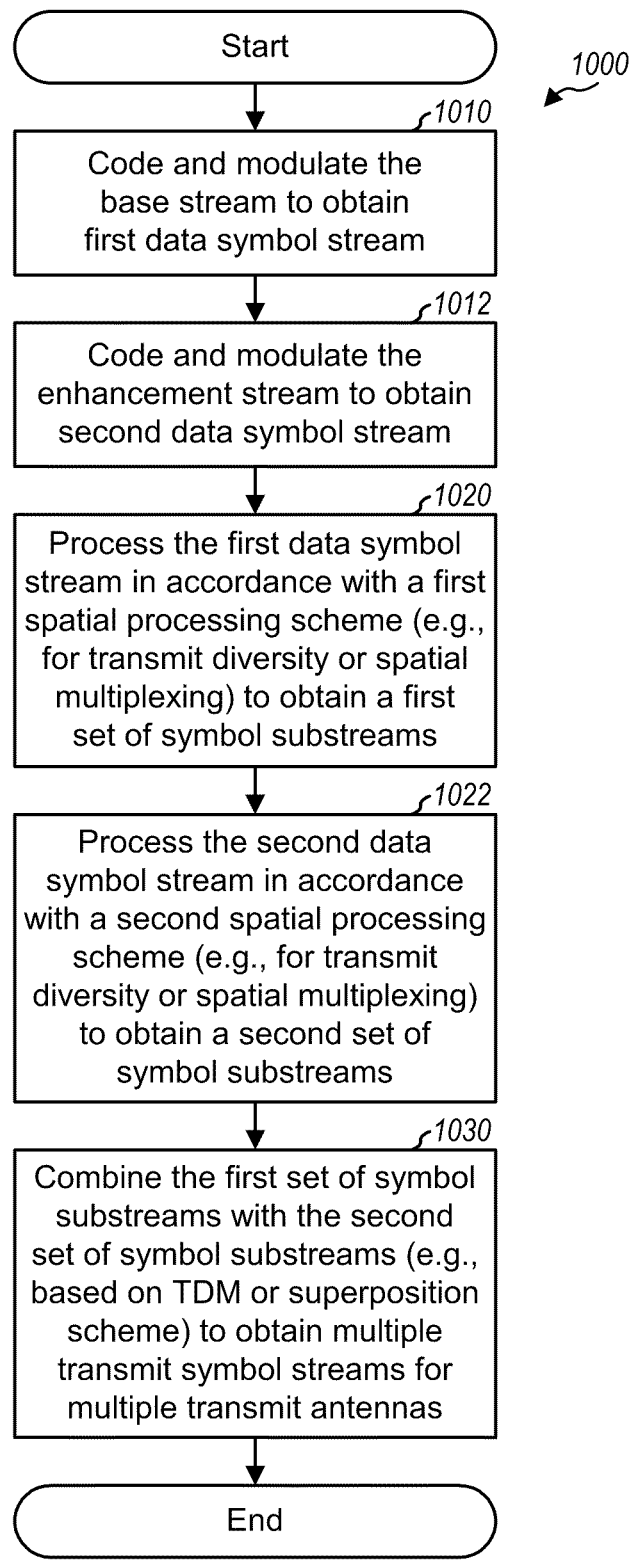
FIG. 10 shows a process performed by the transmitter for hierarchical coding.

FIG. 10 shows a flow diagram of a process 1000 performed by a transmitter for hierarchical coding of the base stream and enhancement stream (e.g., for broadcast service) in a MISO or MIMO system.

The base stream is coded and modulated by a first data processor (e.g., composed of encoder 412a, channel interleaver 414a, and modulator 416a in FIG. 4A) to obtain a first data symbol stream $\{s_b\}$ (step 1010). The enhancement stream is coded and modulated by a second data processor (e.g., composed of encoder 412b, channel interleaver 414b, and modulator 416b) to obtain a second data symbol stream $\{s_e\}$ (step 1012).

The first data symbol stream $\{s_b\}$ is processed in accordance with a first spatial processing scheme by a first spatial processor (e.g., TX Div/SM processor 420a) to obtain a first set of symbol substreams (step 1020). The second data symbol stream $\{s_e\}$ is processed in accordance with a second spatial processing scheme by a second spatial processor (e.g., TX Div/SM processor 420b) to obtain a second set of symbol substreams (step 1022). The first spatial processing scheme may be a transmit diversity scheme (in which case the first set of symbol substreams is $\{s'_{e1}\}$ and $\{s'_{b2}\}$) or a spatial multiplexing scheme (in which case the first set of symbol substreams is $\{s_{b1}\}$ and $\{s_{b2}\}$). The second spatial processing scheme may also be a transmit diversity scheme (in which case the second set of symbol substreams is $\{s'_{e1}\}$ and $\{s'_{e2}\}$) or a spatial multiplexing scheme (in which case the second set of symbol substreams is $\{s_{e1}\}$ and $\{s_{e2}\}$).

The first set of symbol substreams is combined with the second set of symbol substreams to obtain multiple transmit symbol streams $\{x_1\}$ and $\{x_2\}$ for transmission from multiple transmit antennas (step 1030). The combining may be achieved by time division multiplexing the first set of symbol substreams with the second set of symbol substreams to obtain the transmit symbol streams. Alternatively, the combining may be achieved with superposition by (1) scaling the first set of symbol substreams with a first scaling factor $K_b$, (2) scaling the second set of symbol substreams with a second scaling factor $K_e$, and (3) summing the first set of scaled symbol substreams with the second set of scaled symbol substreams to obtain the transmit symbol streams.

The base stream may be coded, modulated, and spatially processed for recovery by receiving entities achieving a first SNR or better. The enhancement stream may be coded, modulated, and spatially processed for recovery by receiving entities achieving a second SNR or better, where the second SNR is higher than the first SNR.

For broadcast service, the transmitter typically does not know the channel realizations (i.e., channel responses) of the receivers. In this case, the coding and modulation of the base stream and enhancement stream are not dependent on the channel realizations of the receivers. The coding and modulation may be performed in accordance with rates selected for these streams based on expected channel conditions (and not measured channel conditions) for receivers in the system. For broadcast service, the spatial processing for the base stream and enhancement stream is also not dependent on channel realizations of the receivers.

For some services, the transmitter may have information for the (instantaneous, average, or expected) channel realizations of the receivers. In this case, the coding and modulation for the base and enhancement streams may be performed in accordance with rates selected for these streams based on the known channel realizations.

Figures 11A, 11B:
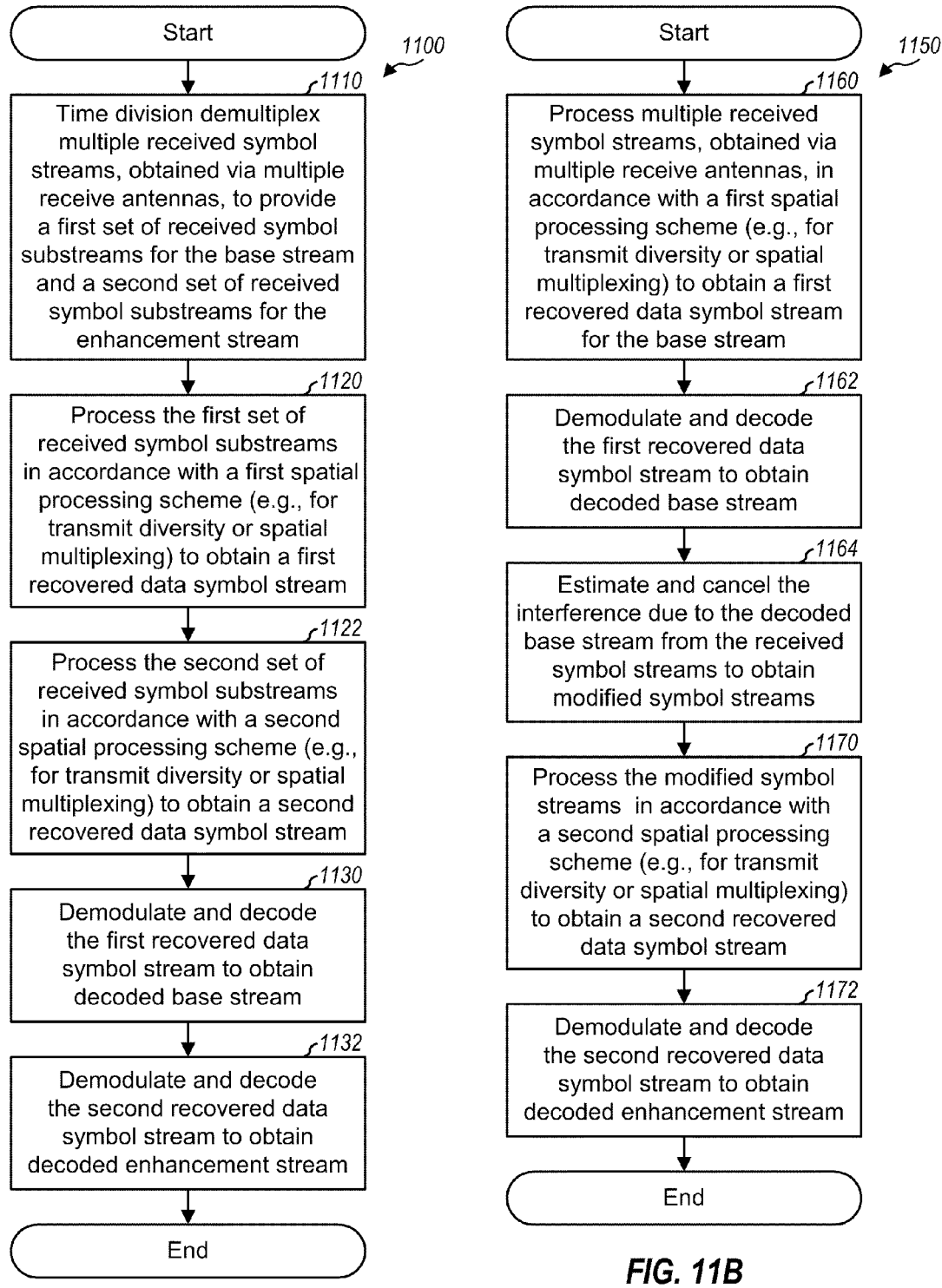
FIGS. 11A and 11B show processes performed by the receiver for hierarchical coding with the TDM and superposition schemes, respectively.

FIG. 11A shows a flow diagram of a process 1100 performed by a receiver to receive the base stream and enhancement stream that have been transmitted with hierarchical coding in a SIMO or MIMO system. Process 1100 may be used for the TDM scheme.

Multiple received symbol streams (e.g., $\{y_1\}$ and $\{y_2\}$), which are obtained via multiple receive antennas, are time division demultiplexed to provide a first set of received symbol substreams (e.g., $\{y_{b1}\}$ and $\{y_{b2}\}$) for the base stream and a second set of received symbol substreams (e.g., $\{y_{e1}\}$ and $\{y_{e2}\}$) for the enhancement stream (step 1110). The first set of received symbol substreams is processed in accordance with a first spatial processing scheme (e.g., a transmit diversity scheme or a spatial multiplexing scheme) by a first spatial processor (e.g., RX Div/SM processor 820a in FIG. 8A) to obtain a first recovered data symbol stream $\{\hat{s}_b\}$ (step 1120). The second set of received symbol substreams is processed in accordance with a second spatial processing scheme (e.g., a transmit diversity scheme or a spatial multiplexing scheme) by a second spatial processor (e.g., RX Div/SM processor 820b) to obtain a second recovered data symbol stream $\{\hat{s}_e\}$ (step 1122). The first recovered data symbol stream $\{\hat{s}_b\}$ is demodulated and decoded by a first data processor (e.g., composed of demodulator 832a, channel deinterleaver 834a, and decoder 836a) to obtain a decoded base stream $\{\hat{d}_b\}$ (step 1130). The second recovered data symbol stream $\{\hat{s}_e\}$ is demodulated and decoded by a second data processor to obtain a decoded enhancement stream $\{\hat{d}_e\}$ (step 1132).

FIG. 11B shows a flow diagram of a process 1150 performed by a receiver to receive the base stream and enhancement stream that have been transmitted with hierarchical coding in a SIMO or MIMO system. Process 1150 may be used for the superposition scheme.

Multiple received symbol streams (e.g., $\{y_1\}$ and $\{y_2\}$), which are obtained via multiple receive antennas, are processed in accordance with a first spatial processing scheme (e.g., a transmit diversity scheme or a spatial multiplexing scheme, by spatial processor 920a in FIG. 9A) to provide a first recovered data symbol stream $\{\hat{s}_b\}$ for the base stream (step 1160). The first recovered data symbol stream $\{\hat{s}_b\}$ is then demodulated and decoded (e.g., by RX data processor 940a) to obtain a decoded base stream $\{\hat{d}_b\}$ (step 1162). Interference due to the decoded base stream is estimated and canceled from the received symbol streams (e.g., by TX data processor 950a and interference canceller 930a) to obtain modified symbol streams (e.g., $\{y'_1\}$ and $\{y'_2\}$) (step 1164).

The modified symbol streams are processed in accordance with a second spatial processing scheme (e.g., a transmit diversity scheme or a spatial multiplexing scheme, by spatial processor 920b) to obtain a second recovered data symbol stream $\{\hat{s}_e\}$ (step 1170). The second recovered data symbol stream $\{\hat{s}_e\}$ is demodulated and decoded (e.g., by RX data processor 940b) to obtain a decoded enhancement stream $\{\hat{d}_e\}$ (step 1172).

For clarity, the hierarchical coding techniques have been specifically described for a (2, 2) MIMO system in much of the description above. In general, these techniques may be used for a SIMO system with any number of receive antennas, a MISO system with any number of transmit antennas, and a MIMO system with any number of transmit antennas and any number of receive antennas. STTD transmits two symbols from two transmit antennas in each symbol period. Other transmit diversity schemes that can transmit more than two symbols from more than two transmit antennas in each symbol period may also be used and are described in the aforementioned U.S. patent application Ser. No. 10/179,439. At the receiver, the spatial processing for STTD can be extended to any number of receive antennas. For the spatial multiplexing scheme, the zero-forcing, MMSE, and other receiver processing techniques can also accommodate any number of receive antennas.

Also for clarity, the hierarchical coding techniques have been specifically described for a single-carrier communication system. These techniques may also be used for a multi-carrier communication system with multiple ($N_F$) sub-carriers or frequency subbands that may be used for data transmission. The multi-carrier system may be an OFDMA system, an OFDM system, and so on. For a multi-carrier system, the base stream and enhancement stream may be coded and modulated separately to obtain two data symbol streams. Each data symbol stream may be demultiplexed into multiple data symbol substreams, one substream for each of the $N_F$ sub-carriers. A pair of data symbol substreams is provided for each sub-carrier for the base stream and enhancement stream. The pair of data symbol substreams for each sub-carrier may be spatially processed (e.g., a transmit diversity scheme or a spatial multiplexing scheme) in the manner described above for the single-carrier system to obtain a pair of transmit symbol substreams for that sub-carrier (if two transmit antennas are used). $N_F$ pairs of transmit symbol substreams are obtained for the $N_F$ sub-carriers of the pair of transmit antennas. The $N_F$ transmit symbol substreams for each transmit antenna are then processed (e.g., based on OFDM or some other multi-carrier modulation technique) to obtain a modulated signal for that transmit antenna. The complementary processing is performed at the receiver to recover the base stream and enhancement stream. OFDM processing at the transmitter and receiver is described in detail in the aforementioned provisional U.S. Patent Application Ser. No. 60/421,309.

The hierarchical coding techniques have also been specifically described for the transmission and reception of the base stream and enhancement stream for broadcast service. In general, these techniques may be used to transmit and receive any number of data streams, where each data stream may be coded, modulated, and spatially processed in a manner to allow receiving entities achieving a designated target SNR or better to receive the data stream. Thus, these techniques may be used to support multi-tiered broadcast service (i.e., two or more tiers).

The hierarchical coding techniques may also be used for unicast and multicast services. For unicast service, a different symbol stream may be transmitted to each of multiple users. Each symbol stream may be transmitted at a particular rate and using a particular transmission scheme (e.g., transmit diversity or spatial multiplexing). The rates and/or transmission schemes for the multiple symbol streams transmitted simultaneously to the multiple users may be determined based on feedback provided by the users. If superposition is used for the multiple symbol streams, then (1) the transmitter informs the users of the transmission scheme being used for each user and (2) the better user with higher SNR receives, detects, decodes, and cancels the symbol stream of the disadvantaged user prior to detecting and decoding the symbol stream sent to the better user. For multicast service, a different symbol stream may be sent to each group of users. The rate and/or transmission scheme to use for each symbol stream are dependent on the channel of the worst user in the group.

The techniques described herein may also be used to support data transmission to different types of receiving entities. For example, the base stream may be coded, modulated, and spatially processed (e.g., with a transmit diversity scheme) for reception by receiving entities equipped with a single receive antenna, and the enhancement stream may be coded, modulated, and spatially processed (e.g., with a transmit diversity or spatial multiplexing scheme) for reception by receiving entities equipped with multiple receive antennas.

The hierarchical coding techniques described herein may be implemented by various means. For example, these techniques may be implemented at a transmitter and a receiver in hardware, software, or a combination thereof. For a hardware implementation, the processing units used for hierarchical coding at the transmitter (e.g., TX data processor 310 and TX spatial processor 320) and the processing units used for hierarchical coding at the receiver (e.g., RX spatial processor 360 and RX data processor 370) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the hierarchical coding techniques may be implemented with modules (e.g., procedures, functions, and so on) that perform the functions described herein. The software codes may be stored in a memory unit (e.g., memory units 332 and 382 in FIG. 3) and executed by a processor (e.g., controllers 330 and 380). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting a base stream of data and an enhancement stream of data in a wireless communication system, comprising:

coding and modulating the base stream to obtain a first data symbol stream, wherein the base stream is designated to be received by a plurality of receiving entities;

coding and modulating the enhancement stream to obtain a second data symbol stream, wherein the enhancement stream is designated to be received by at least one receiving entity, and wherein the coding and modulating for the base and enhancement streams are not dependent on channel realizations of receiving entities for the base and enhancement streams;

processing the first data symbol stream in accordance with a first spatial processing scheme to obtain a first plurality of symbol substreams;

processing the second data symbol stream in accordance with a second spatial processing scheme to obtain a second plurality of symbol substreams, wherein the processing for the first and second data symbol streams is not dependent on the channel realizations of the receiving entities for the base and enhancement streams; and combining the first plurality of symbol substreams with the second plurality of symbol substreams to obtain a plurality of transmit symbol streams for transmission from a plurality of transmit antennas, wherein the combining utilizes a time division multiplexing scheme or a superposition scheme, comprising:

scaling the first plurality of symbol substreams that are hierarchically coded with a first scaling factor to obtain a first plurality of scaled symbol substreams, scaling the second plurality of symbol substreams that are hierarchically coded with a second scaling factor to obtain a second plurality of scaled symbol substreams, and performing multiplexing or summing the first plurality of scaled symbol substreams and the second plurality of scaled symbol substreams to obtain the plurality of transmit symbol streams, wherein multiplexing is performed when the time division multiplexing is utilized and summing is performed when the superposition scheme is used.

2. The method of claim 1, wherein the base stream and the enhancement stream are transmitted for a broadcast service.

3. The method of claim 2, wherein the base stream is coded, modulated, and spatially processed for recovery by receiving entities achieving a first signal-to-noise ratio (SNR) or better, and wherein the enhancement stream is coded, modulated, and spatially processed for recovery by receiving entities achieving a second SNR or better, where the second SNR is higher than the first SNR.

4. The method of claim 1, wherein the first spatial processing scheme is a transmit diversity scheme or a spatial multiplexing scheme, and wherein the second spatial processing scheme is the transmit diversity scheme or the spatial multiplexing scheme.

5. The method of claim 1, wherein each of the first and second spatial processing schemes is a transmit diversity scheme.

6. The method of claim 1, wherein each of the first and second spatial processing schemes is a space-time transmit diversity (STTD) scheme.

7. The method of claim 1, wherein the first spatial processing scheme is a transmit diversity scheme and the second spatial processing scheme is a spatial multiplexing scheme.

8. The method of claim 1, wherein each of the first and second spatial processing schemes is a spatial multiplexing scheme.

9. The method of claim 1, wherein the wireless communication system is a multi-carrier communication system.

10. The method of claim 9, wherein the wireless communication system implements orthogonal frequency division multiplexing (OFDM).

11. The method of claim 1, wherein the wireless communication system is single-carrier communication system.

12. An apparatus in a wireless communication system, comprising:

a first data processor operative to code and modulate a base stream of data to obtain a first data symbol stream;

a second data processor operative to code and modulate an enhancement stream of data to obtain a second data symbol stream;

a first spatial processor operative to process the first data symbol stream in accordance with a first spatial processing scheme to obtain a first plurality of symbol substreams;

a second spatial processor operative to process the second data symbol stream in accordance with a second spatial processing scheme to obtain a second plurality of symbol substreams; and a combiner operative to combine the first plurality of symbol substreams with the second plurality of symbol substreams to obtain a plurality of transmit symbol streams for transmission from a plurality of transmit antennas, wherein the combiner is operative using a time division multiplexing scheme or a superposition scheme that:

scales the first plurality of symbol substreams that are hierarchically coded with a first scaling factor to obtain a first plurality of scaled symbol substreams, scales the second plurality of symbol substreams that are hierarchically coded with a second scaling factor to obtain a second plurality of scaled symbol substreams, and performs multiplexing or summing the first plurality of scaled symbol substreams and the second plurality of scaled symbol substreams to obtain the plurality of transmit symbol streams, wherein multiplexing is performed when the time division multiplexing is used and summing is performed when the superposition scheme is used.

13. The apparatus of claim 12, wherein the base stream and the enhancement stream are transmitted for a broadcast service.

14. The apparatus of claim 13, wherein the base stream is coded, modulated, and spatially processed for recovery by receiving entities achieving a first signal-to-noise ratio (SNR) or better, and wherein the enhancement stream is coded, modulated, and spatially processed for recovery by receiving entities achieving a second SNR or better, where the second SNR is higher than the first SNR.

15. The apparatus of claim 12, wherein the first spatial processing scheme is a transmit diversity scheme or a spatial multiplexing scheme, and wherein the second spatial processing scheme is the transmit diversity scheme or the spatial multiplexing scheme.

16. The apparatus of claim 12, wherein each of the first and second spatial processing schemes is a transmit diversity scheme.

17. The apparatus of claim 12, wherein each of the first and second spatial processing schemes is a space-time transmit diversity (STTD) scheme.

18. The apparatus of claim 12, wherein the first spatial processing scheme is a transmit diversity scheme and the second spatial processing scheme is a spatial multiplexing scheme.

19. The apparatus of claim 12, wherein each of the first and second spatial processing schemes is a spatial multiplexing scheme.

20. The apparatus of claim 12, wherein the wireless communication system is a multi-carrier communication system.

21. The apparatus of claim 20, wherein the wireless communication system implements orthogonal frequency division multiplexing (OFDM).

22. The apparatus of claim 12, wherein the wireless communication system is single-carrier communication system.

23. An apparatus in a wireless communication system, comprising:
- means for coding and modulating a base stream to obtain a first data symbol stream, wherein the base stream is designated to be received by a plurality of receiving entities;
- means for coding and modulating an enhancement stream to obtain a second data symbol stream, wherein the enhancement stream is designated to be received by at least one receiving entity, and wherein the coding and modulating for the base and enhancement streams are not dependent on channel realizations of receiving entities for the base and enhancement streams;
- means for processing the first data symbol stream in accordance with a first spatial processing scheme to obtain a first plurality of symbol substreams;
- means for processing the second data symbol stream in accordance with a second spatial processing scheme to obtain a second plurality of symbol substreams, wherein the processing for the first and second data symbol streams is not dependent on the channel realizations of the receiving entities for the base and enhancement streams; and
- means for combining the first plurality of symbol substreams with the second plurality of symbol substreams to obtain a plurality of transmit symbol streams for transmission from a plurality of transmit antennas,
- wherein the means for combining utilizes a time division multiplexing scheme or a superposition scheme, comprising:
  - means for scaling the first plurality of symbol substreams that are hierarchically coded with a first scaling factor to obtain a first plurality of scaled symbol substreams,
  - means for scaling the second plurality of symbol substreams that are hierarchically coded with a second scaling factor to obtain a second plurality of scaled symbol substreams, and
  - means for performing multiplexing or summing the first plurality of scaled symbol substreams and the second plurality of scaled symbol substreams to obtain the plurality of transmit symbol streams, wherein multiplexing is performed when the time division multiplexing is utilized and summing is performed when the superposition scheme is utilized.

24. The apparatus of claim 23, wherein the base stream and the enhancement stream are transmitted for a broadcast service.

25. The apparatus of claim 24, wherein the base stream is coded, modulated, and spatially processed for recovery by receiving entities achieving a first signal-to-noise ratio (SNR) or better, and wherein the enhancement stream is coded, modulated, and spatially processed for recovery by receiving entities achieving a second SNR or better, where the second SNR is higher than the first SNR.

26. The apparatus of claim 23, wherein the first spatial processing scheme is a transmit diversity scheme or a spatial multiplexing scheme, and wherein the second spatial processing scheme is the transmit diversity scheme or the spatial multiplexing scheme.

27. The apparatus of claim 23, wherein each of the first and second spatial processing schemes is a transmit diversity scheme.

28. The apparatus of claim 23, wherein each of the first and second spatial processing schemes is a space-time transmit diversity (STTD) scheme.

29. The apparatus of claim 23, wherein the first spatial processing scheme is a transmit diversity scheme and the second spatial processing scheme is a spatial multiplexing scheme.

30. The apparatus of claim 23, wherein each of the first and second spatial processing schemes is a spatial multiplexing scheme.

31. The apparatus of claim 23, wherein the wireless communication system is a multi-carrier communication system.

32. The apparatus of claim 31, wherein the wireless communication system implements orthogonal frequency division multiplexing (OFDM).

33. The apparatus of claim 23, wherein the wireless communication system is single-carrier communication system.

34. A computer program product tangibly embodied on a non-transitory computer-readable storage medium, the computer program product comprising instructions operable to cause a computer to perform operations, comprising:
- coding and modulating a base stream to obtain a first data symbol stream, wherein the base stream is designated to be received by a plurality of receiving entities;
- coding and modulating an enhancement stream to obtain a second data symbol stream, wherein the enhancement stream is designated to be received by at least one receiving entity, and wherein the coding and modulating for the base and enhancement streams are not dependent on channel realizations of receiving entities for the base and enhancement streams;
- processing the first data symbol stream in accordance with a first spatial processing scheme to obtain a first plurality of symbol substreams;
- processing the second data symbol stream in accordance with a second spatial processing scheme to obtain a second plurality of symbol substreams, wherein the processing for the first and second data symbol streams is not dependent on the channel realizations of the receiving entities for the base and enhancement streams; and
- combining the first plurality of symbol substreams with the second plurality of symbol substreams to obtain a plurality of transmit symbol streams for transmission from a plurality of transmit antennas,
- wherein the combining utilizes a time division multiplexing scheme or a superposition scheme, comprising:
  - scaling the first plurality of symbol substreams that are hierarchically coded with a first scaling factor to obtain a first plurality of scaled symbol substreams,
  - scaling the second plurality of symbol substreams that are hierarchically coded with a second scaling factor to obtain a second plurality of scaled symbol substreams, and
  - performing multiplexing or summing the first plurality of scaled symbol substreams and the second plurality of scaled symbol substreams to obtain the plurality of transmit symbol streams, wherein multiplexing is performed when the time division multiplexing is utilized and summing is performed when the superposition scheme is utilized.

35. The computer program product of claim 34, wherein the base stream and the enhancement stream are transmitted for a broadcast service.

36. The computer program product of claim 35, wherein the base stream is coded, modulated, and spatially processed for recovery by receiving entities achieving a first signal-to-noise ratio (SNR) or better, and wherein the enhancement stream is coded, modulated, and spatially processed for recovery by receiving entities achieving a second SNR or better, where the second SNR is higher than the first SNR.

37. The computer program product of claim 34, wherein the first spatial processing scheme is a transmit diversity scheme or a spatial multiplexing scheme, and wherein the second spatial processing scheme is the transmit diversity scheme or the spatial multiplexing scheme.

38. The computer program product of claim 34, wherein each of the first and second spatial processing schemes is a transmit diversity scheme.

39. The computer program product of claim 34, wherein each of the first and second spatial processing schemes is a space-time transmit diversity (STTD) scheme.

40. The computer program product of claim 34, wherein the first spatial processing scheme is a transmit diversity scheme and the second spatial processing scheme is a spatial multiplexing scheme.

41. The computer program product of claim 34, wherein each of the first and second spatial processing schemes is a spatial multiplexing scheme.

42. The computer program product of claim 34, wherein the wireless communication system is a multi-carrier communication system.

43. The computer program product of claim 42, wherein the wireless communication system implements orthogonal frequency division multiplexing (OFDM).

44. The computer program product of claim 34, wherein the wireless communication system is single-carrier communication system.

* * * * *